US008741978B2

(12) United States Patent
Moy et al.

(10) Patent No.: US 8,741,978 B2
(45) Date of Patent: Jun. 3, 2014

(54) PREPREGS AND CURED IN PLACE SOLID SURFACES PREPARED THEREFROM

(75) Inventors: Thomas M. Moy, Hilliard, OH (US);
Becky E. Bushong, Plain City, OH (US);
David A. Hutchings, Dublin, OH (US);
Danny G. Hartinger, Hudson, WI (US);
John Martin, Jr., Columbus, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 714 days.

(21) Appl. No.: 11/606,722

(22) Filed: Nov. 30, 2006

(65) Prior Publication Data
US 2007/0225443 A1    Sep. 27, 2007

Related U.S. Application Data

(60) Provisional application No. 60/740,978, filed on Nov. 30, 2005.

(51) Int. Cl.
*B32B 27/04* (2006.01)
*B32B 27/30* (2006.01)
*C08K 9/04* (2006.01)

(52) U.S. Cl.
USPC ...... 522/1; 428/308.4; 428/319.3; 428/320.2; 523/200; 523/205; 523/210

(58) Field of Classification Search
USPC ............. 522/37, 38, 71, 79, 182, 1; 525/107; 428/308.4, 319.3, 320.2; 523/200, 205, 523/210
See application file for complete search history.

(56) References Cited

U.S. PATENT DOCUMENTS

| | | | |
|---|---|---|---|
| 4,425,287 A | | 1/1984 | Hesse et al. |
| 4,745,215 A | | 5/1988 | Cox et al. |
| 5,165,989 A | | 11/1992 | Bhatnagar et al. |
| 5,368,922 A | * | 11/1994 | Portelli et al. ............... 442/149 |
| 5,453,449 A | * | 9/1995 | Drueke et al. ................. 522/6 |
| 5,539,017 A | * | 7/1996 | Rheinberger et al. ......... 523/116 |
| 5,554,666 A | | 9/1996 | Livesay |
| 5,945,489 A | * | 8/1999 | Moy et al. .................... 525/471 |
| 6,025,410 A | * | 2/2000 | Moy et al. .................... 522/182 |
| 6,673,851 B2 | * | 1/2004 | Moy et al. .................... 522/173 |
| 6,713,144 B2 | * | 3/2004 | Bundo et al. ................. 428/40.1 |
| 7,307,106 B2 | * | 12/2007 | Fansler et al. ................. 522/34 |
| 2003/0225180 A1 | * | 12/2003 | Gaudl et al. .................. 522/149 |
| 2004/0166304 A1 | * | 8/2004 | Vallittu et al. ............... 428/313.3 |
| 2004/0229973 A1 | * | 11/2004 | Sang et al. .................... 523/118 |
| 2004/0254261 A1 | * | 12/2004 | Kojima et al. ................ 523/118 |
| 2005/0080202 A1 | * | 4/2005 | Narayan-Sarathy et al. . 525/458 |
| 2005/0245631 A1 | * | 11/2005 | Gould et al. ................... 522/71 |
| 2005/0245721 A1 | * | 11/2005 | Beckley et al. ................ 528/271 |
| 2005/0261388 A1 | | 11/2005 | Gould et al. |
| 2006/0167180 A1 | * | 7/2006 | Plaut et al. .................... 525/187 |

OTHER PUBLICATIONS

International Search Report and Written Opinion in connection with PCT/US2006/45660, the PCT filing of the referenced application Sep. 13, 2007.
International Preliminary Report on Patentability issued in connection with PCT/U2006/45660, the PCT filing of the referenced application Jun. 12, 2008.

* cited by examiner

*Primary Examiner* — Michael Pepitone
(74) *Attorney, Agent, or Firm* — Mark A. Montana

(57) ABSTRACT

A prepreg which is capable of being cured-in-place into a solid surface by irradiation, heating or a combination of the two is prepared. The cured-in-place solid surfaces can be used as veneer cladding for rigid substrates such as floor and wall tiles, kitchen and bath counter tops, sinks, cabinet door veneers, bath surrounds, architectural surfaces such as columns and roofs and the like.

39 Claims, 4 Drawing Sheets

PREPREGS AND CURED IN PLACE SOLID SURFACES PREPARED THEREFROM

CROSS REFERENCE TO RELATED APPLICATIONS

This application claims the benefit of priority under 35 USC 119 (e) of provisional application 60/740,978, filed Nov. 30, 2005, the entire disclosure of which is incorporated herein by reference.

TECHNICAL FIELD

The disclosure is directed to compositions capable of providing cured-in-place solid surfaces, cured-in-place solid surface prepared from prepregs, methods of making the prepregs, and methods of preparing the solid surface articles. More particularly the disclosure relates to solid surface veneers or claddings applied to a substrate wherein the solid surfaces are prepared from prepregs composed of filler, a radiation curable resin, an initiator, optionally cure rate additives, maturation/thickening enhancement prepolymers or additives, and optionally shelf life enhancers. The cured-in-place solid surfaces (CIPS) of the present disclosure can be used as veneer cladding for rigid substrates such as floor and wall tiles, kitchen and bath counter tops, sinks, cabinet door veneers, bath surrounds, architectural surfaces such as columns and roofs and the like.

BACKGROUND

The most cost-effective kitchen counter surface medium is the decorative laminate composite construction. This material offers a wide range of performance advantages in terms of mar resistance, toughness/durability and ease of installation. The material is based on urea formaldehyde (UF)-bonded particle board clad with a thin sheet (60-100 mils) of a Kraft Paper composite laminate (the decorative laminate). At least two types of resin systems are used in the composite construction. The bulk of the composite is formed by saturating paper with an aqueous or polar solvent thinned phenolic resole solution using a continuous process in which the water and/or solvent are removed in a drying oven, allowing advancement (B-staging) of the resin impregnate to a degree of advancement such that a 5 stack (20-30 sheets) of the prepreg papers can be stack-press molded. This process is accomplished at 1000 psi and 270-350° F. for 5-30 minutes to give a highly crosslinked composite offering a broad range of environmental resistance. Surface performance in decorative laminates is achieved by topping the composite with 2-4 sheets of an amine resin (melamine formaldehyde (MF) or urea formaldehyde (UF)) Kraft prepreg prepared similarly to the phenolic version. The amine resin prepreg top sheet is Gravure-printed with the design and color scheme of choice. Many decorative laminates are embossed with a wood grain pattern and other designs using patterned platens. Bonding of the decorative laminate to the particle board is achieved using a contact adhesive. Delamination of the sheet from the supporting particle board is a major issue in these constructions. Board swell with moisture pickup is a major source of performance failure. Surface appearance of decorative laminates is their primary deficiency. With use and aging, they degenerate to a very unpleasant, dated appearance.

Another type of surface, solid surface synthetics, are polymer-bonded highly filled -composites offering a stone-like (heavy/solid) appearance and feel. Their density and modulus present a high "ring" when glass or ceramic dinnerware is handled on the bare surface. The first-in front-runner in this area was DuPont's Corian® product line. This product is 70% aluminum trihydrate (ATH) and a reactive polymer derived by dissolution of a high molecular weigh polymethylmethacrylate in methylmethacrylate. It is believed the reactive mixture is cured via a free radical mechanism using hemi-perester of maleic acid having a tertiary alkyl peresster-component most commonly used is monotertiary butyl permaleic acid). Cocatalysts used along with this initiator are water soluble Group II metal salts which permit commercially acceptable cure rates in a range of filler systems. The filled composite is formed in cast cured blocks that are sliced into blank sheets for further customization by installers. The Corian® stock sheets are easily machined and finished into a variety of design options. Repair and refinishing are possible due to the machinability of the material. The filler system is uniform throughout the composite, allowing for refinishing without changing the appearance of article. The next generation of this product line is a 93% crushed quartz composite system marketed under the trademark Zodiac® by DuPont.

SUMMARY OF DISCLOSURE

In contrast to the above, the present disclosure provides for cure-in-place prepregs, preferably in the form of flexible sheets having a uniform thickness that are print-free or substantially print-free, and capable of being placed on and bonded to flat, contoured, or irregular substrates to create a seamless prepreg veneer. The resulting composite can be cured using ambient light sources, pressure, heat, incident radiation, or combinations thereof to give a solid-surface veneer having the abrasion resistance and durability required for applications such as kitchen counter tops.

The present disclosure relates to a prepreg comprising the reaction product of a curable composition which comprises:
   A. a polymerizable component that comprises a polymerizable monomer, oligomer and/or polymer and a chemically reactive organic thickening chemistry;
   B. a catalyst for the chemically reactive organic thickening chemistry;
   C. a filler; and
   D. a photoinitiator; peroxide or both, and
   wherein the prepreg is flexible, tack-free and print-free or substantially print-free.

Prepregs of the present disclosure can be formed into a sheet, or other shape suitable for subsequent processing into a desired final product. The prepregs are preferably print free, i.e. it is believed that the crosslink density of the print free prepreg imparts recoverable elasticity to the fully mature prepreg; or substantially print-free, i.e. it is believed that they lack sufficient crosslink density to allow complete recoverable elasticity but still allow seamless joint preparation.

The prepregs can be prepared as flexible, tack-free sheets that exhibit a shelf life in their uncured state of greater than 100 hours at 60° C. or greater than 30 days at room temperature.

Mature prepregs of this disclosure can be used to prepare solid-surface claddings with the advantage that they can be cured to relatively thick sections using low energy visible light sources in reasonable cure times. In prepreg formulations containing high optical density fillers or pigments a combination of photo and infrared (IR) cure from ambient to about 70° C. can be used to form a cured-in-place article.

In sheet form, the prepreg composites of this disclosure comprise a mature prepreg paste generally enclosed between two films designated as the carrier and release film sheets. The prepreg composite functions to allow transport of the mature paste sheet to the substrate surface after removal of a release sheet. The radiation-transparent carrier sheet serves as an oxygen barrier allowing rapid radiant-cure of the mature paste. For complex conformations the carrier sheet can be removed and replaced with a film coating prepared from a reactive liquid inert to the prepreg, such as an aqueous emulsion of polyethylene vinyl acetate.

The mature prepreg of this disclosure may be provided in sheet form or as otherwise needed for a specific application. In the case of surface cladding applications it is necessary to have a mature prepreg of uniform thickness and with a flexibility allowing coverage of small radius curvatures. It is equally important that handling of the prepregs can be accomplished without print deformations that will modify the desired surface flatness uniformity.

One aspect of the present disclosure relates to a radiation curable prepreg capable of providing cured-in-place solid surfaces which comprises a thermosettable polymer; polymerizable material; a reactive thickening agent, photoinitiator and/or peroxide; and a filler.

Another aspect of the present disclosure relates to a cured-in-place solid surface prepared from the above disclosed prepreg.

A further aspect of the present disclosure relates to a prepreg composite comprising a mature prepreg as disclosed above being located between a carrier sheet and a release film sheet.

A still further aspect of the present disclosure relates to a method of making the above disclosed prepreg.

Another aspect of the present disclosure relates to a method of preparing solid surface articles.

Still other objects and advantages of the present disclosure will become readily apparent by those skilled in the art from the following detailed description, wherein it is shown and described only in the preferred embodiments, simply by way of illustration of the best mode. As will be realized, the disclosure is capable of other and different embodiments, and its several details are capable of modifications in various obvious respects, without departing from the spirit of the disclosure. Accordingly, the description is to be regarded as illustrative in nature and not as restricted.

BEST AND VARIOUS MODES FOR CARRYING OUT DISCLOSURE

Figure 1:
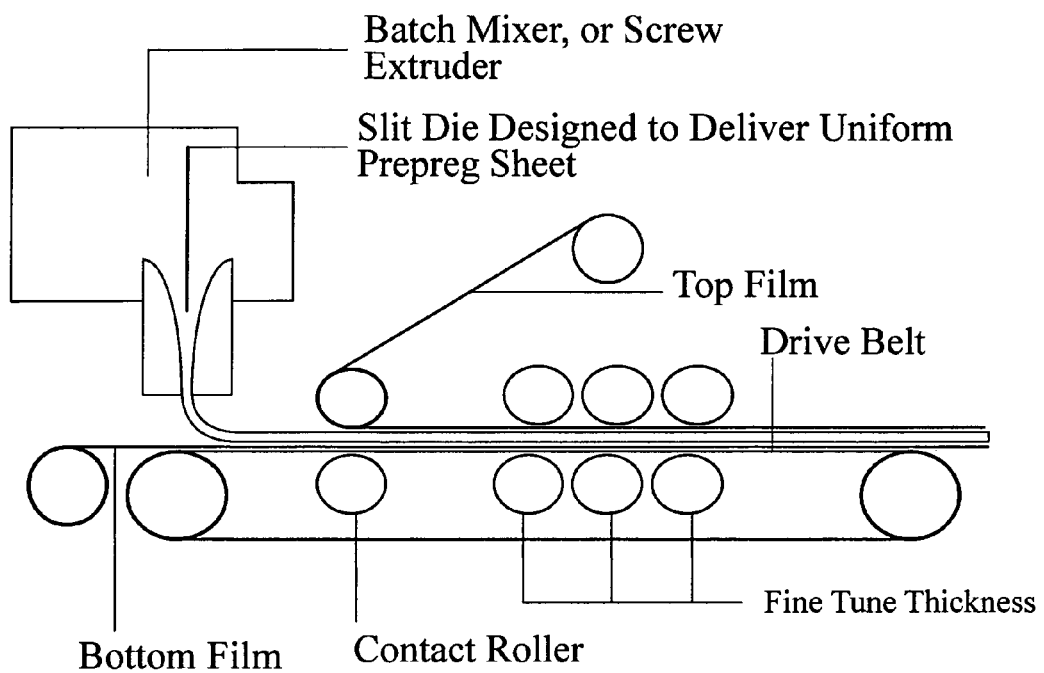
FIG. 1 is a schematic representation of an apparatus used to prepare thermoplastic prepreg sheets having a top and bottom film.

Cure-in-place prepregs (CIPS) are prepared from thermosettable resins or prepolymers, low volatile polymerizable materials (e.g. monomers, oligomers and/or polymers), photo-initiators and/or peroxides, optionally rate enhancing additives, optionally shelf-life promoters, maturation/thickening enhancement chemistries or additives and fillers, and optionally non reactive thermoplastic polymer.

The thermosettable resins useful in the thermosettable prepreg versions of the present disclosure include standard commercial versions of unsaturated polyester resins having number average molecular weight ($M_n$) values in the range of 500-10,000 amu., such as vinyl ester resins, unsaturated polyester, functionalized polyurethane such as polyurethane acrylic resins, and epoxy polymers. Reactive thermoplastic thermoplastic polymers include poly(meth)acrylate resins and thermoplastic polyurethane elastomers and the like that are capable of chain extension. The resins need not be photocurable themselves but must be capable of reacting with the reactive monomers to form a photocurable composition.

Methods of preparing the resins are known in the art. By way of example unsaturated polyester resins are prepared by polyesterifying an organic acid or its corresponding anhydride with a glycol. The organic acids used are typically mixtures of saturated and unsaturated carboxylic acids or anhydrides having at least two carboxyl groups.

The thermosettable resins are crosslinked using a reactive material, e.g. monomer, oligomer and/or polymer. Any reactive monomer known to be useful in the crosslinking of the thermosettable resins of the present disclosure can be used. Typical of these types of reactive monomers are styrene, α-methyl styrene, vinyl toluene, divinyl benzene and the like. However, it is preferable to use materials considered to be low volatile, non-HAPS (hazardous aromatic photo-reactive solvents), monomers, oligomers and/or polymers when compared with traditional reactive monomers such as styrene. Non-limiting examples of such low volatile monomers include compounds containing multiple acrylate functional groups such as trimethyolpropanetriacrylate (TMPTA), compounds containing multiple acrylate functional groups where at least one of the acrylate groups has been modified to contain secondary acrylic radicals some of which are derived from reactions of groups capable of forming secondary acrylate radicals. These can be derived from acrylic acid, or other polyacrylates capable of adding to other acrylate functional groups or directly to the resins, acrylic vinyl esters, condensed acrylates such as the liquid acrylate-acetoacetate Michael addition products described in U.S. Pat. Nos. 5,945,489; 6,025,410 and 6,706,414, the contents of which are expressly incorporated herein by reference or mixtures thereof.

Exemplary acrylate monomers and/or oligomers include, but are not limited to, monoacrylates, diacrylates, triacrylates, poly-functional acrylates, epoxy acrylates, aromatic urethane acrylates, aliphatic urethane acrylates, polyether acrylates, polyester acrylates, melamine acrylates, and any combinations thereof, and the like.

More specifically, acrylate exemplary monomers and/or oligomers include, but are not limited to, methyl acrylate, vinyl acetate, n-butyl acrylate, t-butyl acrylate, ethyl acrylate, 2-ethylhexyl acrylate, isobornyl acrylate, hydroxyethyl acrylate, phenoxy ethyl acrylate (PEA), ethoxyethoxyethyl acrylate (EOEOEA), isodecyl acrylate (IDA), octyldecyl acrylate, ethoxylated phenol acrylate, cyclic trimethylolpropane formal monoacrylate (CTFA), vinyl ester of Versatic 10® (a synthetic C-10 mono carboxylic acid having a tightly branched structure).

Examples of oligomers and/or polymers are diethylene glycol diacrylate, ethoxylated bisphenol A diacrylate (MW=424), 1,6-hexanediol diacrylate, neopently glycol diacrylate, 1,3-propanediol diacrylate, 2-methyl-1,3-propanediol diacrylate, polyethylene glycol diacrylate (MW=302, 508), propoxylated neopentyl glycol diacrylate (MW=328) (PONPGDA or NPGPODA). Tetraethylene glycol diacrylate (MW=302), triethylene glycol diacrylate (MW=258), tripropylene glycol diacrylate (DPGDA) (MW=300), dipropylene glycol diacrylate, diacrylated epoxy bisphenol-A; pentaerythritol triacrylate, propoxylated glycerol triacrylate, trimethylolpropane triacrylate (TMPTA), triethoxylated trimethylolpropane triacrylate (EOTMPTA or TMPEOTA) (MW=428), propoxylated glycerol triacrylate (GPTA) (MW=428), pentaerythritol tetraacrylate (PETA), tris(2-hydroxy ethyl)isocyanurate triacrylate (ME=423), melamine triacrylate, polyacrylated versions of methylolated melamine and their partially butoxylated systems; pentaerythritol tetraacrylate (PETA), dipentaerythritol pentaacrylate (DPPA), dipentaerythritol hydroxylpentaacrylate, ditrimethylolpropane tetraacrylate (di-TMPTA), and alkoxylated pentaerythritol tetraacrylate (PPTTA).

The selection criteria placed on members of the low and high molecular weight resin classes are that typically in combination they achieve the viscosity needed to generate a useful prepreg sheet paste in combination with the fillers of this disclosure. For on-site installations using the prepreg of this disclosure with low volatility reactive monomers as solvents lowers the potential for flammable ignitions during installation, as well as providing the installer and customer with a safe environment during installation, with acceptable levels of released hazardous or otherwise objectionable volatile organics.

For the cast method of prepreg preparation, advantageously prepolymer resin compositions are used which contain resin-reactive monomer combinations having low initial viscosities. This method allows for a low viscosity paste which can more easily be devolatilized and cast into prepreg sheet or other forms having the capability of latent thickening. These prepolymers require additional components (such as reactive thickening resins) capable of undergoing an A-stage "thickening" reaction to form a B-staged (matured) photo-reactive prepreg paste. The reactive thickening resins of this disclosure operate using chemistries which allow retention of a sufficient level of photo-reactive constituents in the matured prepreg paste to preserve target prepreg cure performance goals during cure-in-place installation.

Photoinitiators are one kind of initiator used in the cure-in-place prepregs (CIPS). The most useful photoinitiators are those activated in the visible light range of the spectrum. An example this class of photoinitiator is bis(2,4,6-trimethylbenzoyl)phenylphosphine oxide available from Ciba-Geigy as Ir-gacure® 819 photoinitiator. This is a member of the acylphosphine oxide class of photoinitiators. These are described in U.S. Pat. No. 4,265,723, and are distinguished by their high reactivity upon irradiation with long wavelength radiation in the range of 300-500 nm, a portion of which falls in the visible spectrum, 400-800 nm. This class is described by the following general formula,

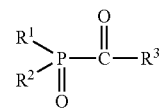

where $R^1$ is straight-chained or branched alkyl of 1 to 6 carbon atoms, cyclohexyl, cyclopentyl, aryl which is unsubstituted or substituted by halogen, alkyl or alkoxy, or a S-containing or N-containing five-membered or six-membered heterocyclic radical. $R^2$ has one of the meanings of $R^1$ ($R^1$ and $R^2$ may be identical or different), or is an alkoxy of 1 to 6 carbon atoms, aryloxy or aralkoxy, or $R^1$ and $R^2$ together form a ring. $R^3$ is straight-chain or branched alkyl of 2 to 18 carbon atoms, a cycloaliphatic radical of 3 to 10 carbon atoms, phenyl, naphthyl or S—, O— or N-containing five-membered or six-membered heterocyclic radical, and may contain additional substituents in the group

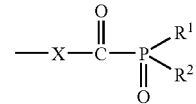

where $R^1$ and $R^2$ have the above meanings and X is phenyl or an aliphatic or cycloaliphatic divalent radical of 2 to 6 carbon atoms, and one or more of the radials $R^1$ to $R^2$ may be unsaturated.

A second class of photoinitiators consists of the cyanine borates developed as part of the Mead Imaging, Cycolor Process®. These photoinitiators are derived as organic-soluble salts of cationic cyanine dyes and tetraalkyl, and/or aryl functional borate anions. These initiators liberate the borate alkyl-, and/or aryl-radical constituents as active olefin polymerization-initiating free radicals when subjected to visible radiation associated with the $\lambda_{max}$ of the cationic cyanine dye component. These photoinitiators are dyes that impart color when used to initiate cure in a composite matrix, but are quickly faded to obscurity by normal ambient light exposure. These photoinitiators can be designed to be activated by visible radiation throughout the visible spectrum depending on the degree of extended conjugation in the dye component, and offer a unique means of curing CIPS composite systems containing a range of pigments.

Examples of peroxides useful in the disclosure includes organic peroxides The organic peroxides useful in this disclosure include: The peroxyesters include, but not limited to, tert-butylperoxy-2-ethylhexylcarbonate, tert-amylperoxy-2-ethylhexanoate, tert-butylperoxy-2-ethylhexanaote-98%, 50% in plasticizer, 50% in organic mineral spirits (OMS); tert-amylperoxy-2-ethylhexanoate-98%, -70% in plasticizer, -75% in (OMS), 2,5-dimethyl-2,5-di(2-ehtylhexanoylperoxy)hexane-90%, tert-butylperoxypemeodecanoate-75% in OMS, tert-butylperoxy-3,5,4-trimethylhexanoate, tert-butylperoxyisopropyl carbonate, tert-amylperoxybenzoate-80% in amyl alcohol (AA), tert-butylperoxy-2-methylbenzoate-75% in OMS. The peroxyketals including but not limited to, analogues of the following: 1,1-di(tert-butylperoxy)-3,3,5-trimethylcyclohexane-75% in plasticizer,-75% in isododecane. Polycarbonates include, but not limited to di(tert-butylcyclohexyl)peroxycarbonate.

Peroxides derived from ketones and hydrogen peroxides, such as MEK-peroxide, which contains a portion of hydroperoxide functionality, are not preferred for this application since it has been shown that hydroperoxides decrease prepreg shelf-life. Similarly, cumene hydroperoxide is not preferred for applications requiring long prepreg shelf life. Hydroperoxides are also not especially preferred because they tend to reduce shelf life and render stored prepregs unusable. These materials do have application in those processes in which the methods defined herein are applied to a manufacturing process in which the prepregs of this disclosure are utilized to make solid surface products with no storage interval.

Contrary to standard peroxide cure systems that affect a cure when heat is added, the prepregs of the present disclosure are stable at 60° C., but are capable of enhanced photocure performance at room temperature with the combination of photoinitiator and organic peroxide. They provide an ancillary cure mechanism under conditions where photocure is insufficient to achieve full depth-of-cure. In the case of the reactively-thickened polymers, peroxide additives can provide supplemental cure paths allowing optimal prepreg mechanical performance and toughness. It has been shown that selected additives can lower the initiation temperature of the peroxide component to allow it to supplement the photocure at ambient temperatures to the half-life decomposition temperatures of the peroxide. For Michael Addition-thickened prepreg systems in certain embodiments the cure rate appears to be greatly accelerated by having peroxide additives present during the maturation stage. This is believed to be due to a combination of factors including one or more of the following: (1) the presence of the heterogeneous aluminum trihydrate, (2) advancement of the prepolymer to the prepreg paste B-stage in which higher molecular weight polymers are created having high acrylic pendant group functionality, and (3) system pH modification having a positive effect on the cure rate.

Other additives can be used to further enhance hardness and cure rate performance of the photoinitiator-organic peroxide system. The addition of low levels of active oxygen peroxide of the class described above in combination with cure rate-enhancing additives and a photoinitiator to the resin mixture enhances depth of cure in the cure-in-place composites of the disclosure. These systems also have the capability of giving through-cure in thick sections. In highly optically dense systems the cure rate-enhancing additives are capable of reacting to provide thermal initiation.

These cure rate-enhancing additives includes, but are not limited to, the following: mercaptans (aliphatic, aromatic, heterocyclics and as components of polyesters) such as trimethylolpropane trithiopropionate or dodecylmercaptan; disulfides (aromatic, aromatic heterocyclics, aliphatic, and combinations thereof as mixed disulfides); polysulfides such as thiurams (oxidatively coupled adducts of dialkylamines and carbon disulfide) and benzothiaozle polysulfide accelerators; phosphines (aromatic, aliphatic, and polymers containing the phosphine group); phosphine oxides (aromatic, aliphatic, and mixed), phosphite esters such as triphenyl phosphite; vinyl triazines; branched alkyl aryl amines; sulfinamines; sulfmamides; and their derivatives; alkyl and aryl thioureas or mixtures thereof. When used in conjunction with the photoinitiators and peroxides the resin formulations of the present disclosure have enhanced surface cure rates and through cure.

In order to have solid surface composite generation potential, filler, resin, and a means of cure are required. For photocurable systems, a photoinitator coupled with a radiation source provides the radical source. For highly filled prepregs requiring a rapid cure rate, to attain cure performance goals, a light source, photoinitiator, oxidizer and propagating co-reactants must be employed. Generally, pastes for CIPS prepreg can be made using the prescribed filler, prepolymers, initiator(s) and peroxide components indicated for this disclosure. The pastes can be prepared and stored enclosed (anaerobic), or open (aerobic) for substantial periods of time. Stability towards premature reaction of the prepolymer is provided by conventional stabilizers found in the monomers used and adequate levels of dissolved atmospheric oxygen in the prepreg. However, formulations containing some of the desired propagating co-reactants needed for prepreg photo-cure or photo through-cure exhibit decreased paste bulk storage shelf-life. These propagating co-reactant-containing materials appear to participate in continuous reactions which deplete the stabilizing free oxygen content of the sample, resulting in prepolymer cure. The latter systems can be used commercially if the pastes can be maintained in oxygenated thin-section mature-paste prepregs. The castable prepregs that are formed by reactive thickening offers additional stability performance based on the reduced reactive group mobility resulting from the thickening reaction process. The prepregs of this disclosure can be maintained in an aerobic (oxygen stabilized) state by use of oxygen permeable release films. This method is needed to allow use of the thiol propagating coreactants.

The prepreg compositions of this disclosure are highly filled. In general fillers increase the hardness, stiffness and strength of the final article relative to the pure polymer. In this disclosure it is demonstrated that the filler can provide attributes to the prepreg formed such as development of unique and desirable mechanical properties in the prepreg and in its solid surface composite formed with the substrate, the bonding adhesive, and the solid surface cladding resulting from the cured mature paste. The primary reactive filler of this disclosure is ATH. Its attributes are particularly suited for this application, in particular a low optical density that allows photocure of resins to significant depths at high filler levels. Its refined forms have high whiteness in composite coupled with translucency allowing definition of added decorative ancillary fillers. The surface chemistry of ATH is particularly amenable to the promotion of desirable thickening chemistries particularly with the thickening associated with the Michael Reaction described herein as reactive thickening. In this instance it is believed that the acid-base (amphoteric) nature of the ATH surface allows the use of common caustic as a catalyst allowing paste thickening at rates suitable for continuous prepreg processing. Other fillers including other aluminum-based fillers can be used which offer further options in forming the prepregs and cured composites of this disclosure. These include: alumina, alumina monohydrate, aluminum hydroxide, aluminum oxide, aluminum sulfate, aluminum phosphate, aluminum silicate, borosilicate, calcium sulfate, calcium phosphate, calcium carbonate, and calcium hydroxide, magnesium and all forms of crystalline and amorphous silica. Minerals containing Group II metals in combination with oxides of aluminum and silica can also be used. Combinations of fillers can, of course, be used when desired.

Thickening Reactions:

1. Carbodiimides

Carbodiimides and polycarbodiimides react with pendant monomer and prepolymer active hydrogens to create crosslinking systems suitable for this application. Oligomers and monomers containing carboxyl, hydroxyl, thiol, amine, reactive methylene and the like are reactive in this thickening system. Reactive thickening agents of this CIPS prepreg paste thickening option include monomers based on carbodiimides and polyfunctional carbodiimides in combination with monomers and oligomers reactive with the carbodiimide functionality. Carbodiimides and the polyfunctional carbodiimides exhibit suitable reactivity for low-temperature cure capability with polycarboxyl-functional monomers and oligomers. N-acylurea groups form between carboxylic sites. Other poly-functional monomers useful in forming carbodiimide linkages include hydrazidyl, amino and/or thiol groups. Poly functional carbodiimides can be obtained from polyisocyanates using phospholine oxide as catalyst as is described, for example, in U.S. Pat. No. 2,941,966. Other valuable carbodiimide oligomers can be prepared form polyols and carbodiimides containing isocyanate groups, by reacting the reactants in the presence of from 0.01 to 3% by weight, based on the reaction mixture, of a tin catalyst as is taught in U.S. Pat. No. 4,321,394. The urethane products can be produced at temperatures as low as 25-150° C., using such catalysts as tin(II)acetate or dibutyl tin diacetate. Exemplary polymeric polyols include for example, polyesters, polyethers, polythioethers, polyacetals.

Examples of suitable carbodiimide compounds used in the present invention are N,N'-dicyclohexylcarbodiimide, 1-ethyl-3-(3'-dimethylaminopropyl) carbodiimide, N-ethyl-N'-(3-dimethylaminopropyl)-carbodiimide, N'-diisopropyl-carbodiimide, N'N'-di-tert-butylcarbodiimide 1-cyclo-hexyl-3-(4-diethylaminocyclohexyl)carbodiimide, 1,3-di-(4-diethylaminocyclo-hexyl)carbodiimide, 1-cyclohexyl-3-(diethylaminoethyl)carbodiimide; 1-cyclohexyl-1-cyclohexyl-3-(2-morphonlinyl-(4)-ethyl)carbodiimide 1-cyclohexyl-3-(4-diethyl-aminocyclohexyl)carbodiimide, and the like. There are a variety of commercially available solvent soluble carbodiimides. Carbodiimide compounds are commercially available from Union Carbide Corp., USA under the UCARLNK® designation.

Thickenable pastes for this invention contain: (1) carbodiimide-reactive oligomers such as carboxyl-functional polyurethane oligomers including, for example, those prepared from combinations of diols, dimethylolpropionic acid, and a diisocyanate; or carboxyl-functional unsaturated polyesters; (2) a carbodiimide or polycarbodiimide-functional oligomer to provide crosslinking with the carbodiimide-reactive oligomers; (3) a free radical curable resin component consisting of reactive olefin-containing monomers and oligomers (4) a filler such as aluminum trihydrate; and (5) an additive package containing a paste maturation catalyst, wetting/defoaming agents, and a free radical cure initiator system.

On a weight basis, the polymeric binder composition of this invention comprises between about 1 and 30 weight percent carbodiimide crosslinker per 100 weight percent of the total polymerizable component (thickening plus reactive olefin components). On a weight percentage basis, the total polymerizable component comprises between 1% and 30% carbodiimide crosslinker, between 9% and 90% free radical curable resin component, and between 9% and 90% high molecular carboxyl-functional polymer or oligomer, or optionally other carbodiimide reactive-functionality containing oligomer or polymer. The preferred thermosetting composition contains at least 1% carbodiimide crosslinker. The carbodiimide crosslinker is typically blended into the CIPS paste just prior to use.

For a typical paste composition, a test sample of 3.0 g of dicarbodiimide from the classes described above is added to 70 g of a paste formulation as described above. After stirring to initiate maturation, the paste can be cast into a rectangular frame having a thickness of 0.125 inches. The paste cures to a handlable prepreg in maturation time periods ranging from 5.0 minutes to 24 hours when held at temperatures ranging from 25-60° C. Catalysis can be used to further refine the paste processing for desired process adaptations, for carboxyl coupling, Lewis Acids such as alkyl tin cations are useful.

2. Epoxy Reactions:

Epoxy-reactive thickening compositions for castable CIPS prepreg applications can be prepared from a resin composition comprising: (a) a polyisocyanate compound, (b) a polyepoxide, (c) a free radically-polymerizable compound, (d) an oxazolidone-forming catyalyst, (e) filler, and (f) a thermo- or photo-initiator. The reactive thickening compounds and supplemental catalyst provide low temperature prepreg paste maturation to create a flexible print-resistant prepreg capable of latent, independent free radical cure. Useful prepreg pastes can be prepared by mixing components (a) through (f) and degassing under vacuum. Oxazolidone forming catalysts such as phenolic dialkylbenzylic amines (such as those produced from phenol, formaldehyde, and dialkyldiamines using the Mannich Reaction) are added to the paste to facilitate maturation to yield flexible, print-free prepregs useful for producing solid surface veneers.

Epoxy-reactive thickening compositions for castable CIPS prepreg applications can be prepared from a resin composition comprising (a) a polyalkylamine compound, (b) a polyepoxide, (c) a free radically-polymerizable compound, (d) filler, and (e) a thermo and/or photo-initiator. The reactive thickening compounds provide low temperature prepreg paste maturation to create a flexible print-resistant prepreg capable of latent, independent free radical cure. Polyalkylamines such as diethylenetriamine react with epoxies and reactive olefins such as acrylates. Useful prepreg pastes can be prepared by first creating an epoxy-amine prepolymer having reduced levels of the more reactive primary amines. Further addition of polyfunctional reactive olefin results in cross-linking and grafting of adduct into the prepolymer. Competitive Michael Addition to the reactive olefin component by the amine component of the prepolymer can be reduced by replacement of a portion of the acrylic functionality with methacrylate analogues.

Epoxy reactive thickening compositions for castable CIPS prepreg applications can be prepared from resin compositions comprising (a) a polythiol-functional compound, (b) a polyepoxide, (c) a radical polymerizable compound, (d) a catalyst capable of promoting the thiol-epoxy reaction (e) filler, and (f) a thermo- and/or photo-initiator. The reactive thickening compounds provide low temperature prepreg paste maturation to create a flexible print-resistant prepreg capable of latent, independent free radical cure. Thiol-functional prepolymers can be prepared by pre-reaction of polythiols such as pentaerythritol tetra (3-mercaptopropionate) with a diisocyanate or isocyanate-capped diol. These prepolymers are reactive with the polyepoxy under base catalysis to induce reactive thickening. Competitive Michael Addition to the reactive olefin component by the polythiol prepolymer can be reduced by replacement of a portion of the acrylic functionality with methacrylate analogues.

Epoxy-reactive thickening compositions for castable CIPS prepreg applications can be prepared from a resin composition comprising (a) a β-diketo-reactive methylene compound, (b) a polyepoxide, (c) a radical polymerizable compound, (d) a catalyst capable of promoting the reactive methylene-epoxy reaction (e) filler, and (f) a thermo- and/or photo-initiator. The reactive thickening compounds provide low temperature prepreg paste maturation to create a flexible print-resistant prepreg capable of latent, independent free radical cure.

Isocyanate Reactions:

A reactive thickener type comprises using the reaction of reactive resin chemistries including: urethane, urea, or thiocarbamate linkages derived by the reaction of reactive prepolymer isocyanate functionality with pendant hydroxyl or amine-activated hydroxyl, amine, or thiol functionality. These functionalities can have placement on an existing polymer, or monomer components of the prepreg prepolymer. Also included are the reactions between isocyanates and methylene carbanions derived from base-activated methylenes including, but not limited to, acetoacetic esters. Similarly included are the reactions between isocyanate functionalities and epoxy-functional polymers which are catalyzed by Mannich and other similar bases. Variations in these systems include aliphatic polyisocyanates, which have enhanced resistance to water reactivity, an adverse reaction leading to the generation of carbon dioxide during the prepreg paste maturation process. Classes of reactants having importance are the products formed by the reaction of oxazolidines with activated aldehydes, and other systems having isocyanate-linking potential. The oxazolidine products perform as water-scavengers in the resin-filler paste system.

Polyurethane reactive thickening networks useful for producing CIPS prepregs involve polyurethane-based prepolymers containing hydroxyl and isocyanate functionalities. The required prepolymers are prepared using a range of compositions, and provide thickened networks able to meet the stated CIPS prepreg objectives. They provide the option of reactive olefin functionalization and toughening of final free radical cross-linked networks to meet mechanical and shrinkage requirements in solid surface veneer final products.

Polyisocyanates useful in this disclosure include: aliphatic isocyanates such as: isophorone diisocyanate (IPDI), hydrogenated methylenedianiline diisocyanate, hexamethylene diisocyanate (HMDI), HMDI trimer; and aromatic isocyanates such as diphenylmethane diisocyanate (MDI) and toluenediisocyanate (TDI).

Chain-extended polyisocyanate-capped polyurethanes useful in this disclosure can be prepared by the following methods:

Polyisocyanate-capped diols from polyether diols: Including in this group are those diols derived from: ethylene oxide, propylene oxide, tetrahydrofuran, or extension of diol monomers such as ethylene glycol; polyester diols, including polycaprolactone diols. All of the diols can be converted to isocyanate-capped polyurethanes by controlling diol and diisocyanate stoichiometry to produce isocyanate-capped polyurethanes. Included are combinations of the above diols to produce mixed isocyanate-capped polyurethanes.

Chain-extended hydroxyl-capped polyurethanes useful in this disclosure can be prepared by the following methods:

Hydroxyl-capped polyurethanes can be produced from the reaction of diols (derived from polyethers diols from ring-opening polymerizations of ethylene oxide, propylene oxide, tetrahydrofuran, or their analogues with simple diols such as ethylene glycol; polyesters; ring-opening polyesterifications of diols using lactones such as γ-caprolactone) with diisocyanates by controlling reactant stoichiometry to produce hydroxyl-capping. Also included are combinations of the above diols to produce mixed hydroxyl-capped polyurethanes.

Combinations of chain-extended isocyanate-capped and hydroxyl-capped polyurethanes are then used in combination with mono- and/or poly-activated olefin functionalized esters and polyesters (this class includes acrylate and methacrylate functionalities), fillers, and polymerization initiators to form CIPS prepreg paste compositions capable of being thickened to provide paste maturation with urethane catalysts such as dibutyltin dilaurate (DBTDL).

Chain-extended thiol-capped polyurethanes useful in this disclosure are prepared using the following methods:

Polythiol functional-capped chain-extended polyisocyanate can be formed from the reaction of isocyanate-capped polyurethane diols with thiol-containing monomers such as trimethylolpropane tris(3-mercaptopropionate) using designed stoichiometry to produce thiol-capped polyurethanes.

Reactions of the above thiol-capped polyurethanes with isocyanate-capped oligomers can be used in CIPS prepreg pastes to produce chain-extended thickening networks, forming thiocarbamate linkages during CIPS paste maturation.

Thiocarbamate thickening can be achieved under appropriate catalysis, such as the use of DBTDL. Competitive thiolate anion Michael Addition to activated olefin paste components can be controlled by appropriate selection of acrylate/methacrylate combinations. The slower rate of thiolate anion addition to the methacrylate functionality prevents excessive crosslinking in the paste maturation stage and preserves those reactive olefin constituents for the free radical cure stage of the substrate-bonded CIPS prepreg veneer installation.

Reactions of polyisocyanate or polyisocyanate-capped oligomers with methylolated polyamines or polyamides are useful in this disclosure to provide chain-extended and further cross-linked networks during CIPS paste maturation. These can be prepared using the following methods:

Reactive functionalities useful in this disclosure include oligomers having methylolated amine or amide hydroxyls derived from formylated amines, melamine, urea, and amides. These hydroxyls are reactive with isocyanate functionalities to form N-methylene urethane linkages suitable for CIPS paste resin chain-extension and cross-linking.

Precursors for this oligomer class include difunctional or higher oligomers having terminal or pendant amine or amide functionality suitable for methylolation to generate hydroxyls. Examples include anionic polymerized polyether systems having acrylamide termini suitable for methylolation to provide diols. Also, examples included are partially butylated methylolated melamines having hydroxyl functionality >2. Oligomer members of this class are co-reactive with the terminally-functional isocyanate oligomers described earlier in this section. Linkages produced are highly polar, and have utility in creating crystalline and hydrogen-bonded domains in the matured CIPS prepreg, which is beneficial to handling and cure performance.

Polyisocyanates or polyisocyanate-capped oligomers react with amine-assisted polyols to provide a reactive thickening system useful to this disclosure.

Examples of amine-assisted polyols include hydroxyethylated, or hydroxypropylated amines to provide amine-assisted polyols. Such activated amines are most useful when the amine component is converted to a tertiary amine incapable of urea linkage generation in the reaction with isocyanate functionalities. Examples of amine-assisted polyols include the reaction product of ethylenediamine and ethylene oxide to produce ethylenediamine tetraethanol. A second amine-assisted polyol example class is the Mannich Reaction adducts of formaldehyde and diethanolamine with phenol to produce diethanolbenzylamine-functionalized phenolics. Reaction of the phenolic hydroxyl of this system with ethylene carbonate produces a polyol suitable for use in B-stage thickening of resins requiring maintenance of free radical cure processes in their use. Polyols of these classes are useful in combination with the polyisocyanates and isocyanate-capped polyols identified as useful in CIPS prepreg paste thickening to provide cross-link network formation. Paste thickening formulations containing these materials should also contain oxazolidine or alkylorthoformate water scavengers to prevent carbon dioxide formation in matured prepreg compositions.

Adducts of mono and polyfunctional β-dicarbonyl reactive methylene functionalities with polyisocyanates, or isocyanate-capped oligmers are useful in this disclosure. This reaction forms mono or dicarbamide adduct linkages suitable for resin chain extension and cross-linking.

Examples include the reaction of alkylacetoacetate esters or polyfunctional acetoacetates with polyisocyanates or polyisocyanate-capped oligomers to produce mono or dicarbamide linkages. For CIPS paste systems that anticipate the use of a final free radical cure it is desirable to employ levels of methacrylate monomers or their polyfunctional oligomers. These materials are capable of undergoing free radical thermal- or photo-cure, but are less reactive in competitive Michael Addition-reactive methylene coupling. CIPS prepregs produced using this concept can use water scavengers such as an oxazolidine or alkylorthoformate to prevent induced carbon dioxide formation in their matured compositions.

Adducts of epoxy-functional monomers and oligmers with polyisocyanates or polyisocyanate-capped oligmers can form oxazolidone linkages suitable for resin chain-extension and cross-linking. These systems have utility in this disclosure as CIPS paste thickening agents.

Polyisocyanates useful in this disclosure include aliphatic isocyanates such as: isophorone diisocyanate (IPDI), hydrogenated methylenedianiline diisocyanate, hexamethylene diisocyanate (HMDI), HMDI trimer; and aromatic isocyanates such as diphenylmethane diisocyanate (MDI) and toluenediisocyanate (TDI).

Isocyanate-capped oligomers useful in this disclosure include those listed in previously as CIPS reactive thickening agents.

Di- and higher-functional epoxies useful in this disclosure include aromatic phenolic-based epoxies such as EPON™ 828 and its bisphenol A-extended versions produced by imidazole catalysis. Aliphatic di- and higher-functional epoxies provide advantages in their enhanced UV stability, their in-use resin color performance and enhanced compatibility with other free radical process reactive resins used in the CIPS prepreg cure stage. This class includes glycidylated versions of diols such as hydrogenated bisphenol A, 1,3-propanediol, 2-methyl-1,3-propanediol, 2,2'-dimethyl-1,3-propanediol, and triols such as 1,1,1-trimethylolpropane.

An effective catalyst for facilitation of the isocyanate-epoxy reaction to form oxazolidone linkages is derived by the Mannich Reaction of a dialkylamine, formaldehyde, and phenol to produce a dialkylbenzylic amine-functionalized phenolic. If necessary, these catalysts can be modified by acetylation or alkoxylation to cap the phenolic functionality to mask their free radical process inhibition so that they can be used in CIPS paste maturation without affecting the final free radical cure of the prepreg.

Urethane catalysts include Lewis Base catalysts such as tertiary amines including 1,4-diazabicyclo[2.2.2]octane, 1,8-diazabicyclo[5.3.0]undec-7-ene (DBU), dimethylpiprazine, pentamethyldipropylenetriamine, and bis(dimethylaminoethyl)ether; and Lewis Acid catalysts such as DBTDL, dibutylbis(laurylthio)stannate, dibutyltinbis(isooctylmercapto acetate), and dibutyltinbis(isooctylmaleate).

Other Thickeners

Difunctional reactive methylene compounds such as bisphenol A diacetoacetate can react with polyepoxide compounds to give prepolymers having residual cross-linking reactivity. This capability results from residual reactive methylene protons capable of being catalytically abstracted to generate nucleophiles, which can react with residual olefins. Thus, the epoxides and reactive methylene compounds may be reacted to produce chain-extended structures. These structures may then be added to the reactive olefin component to induce thickening by a Michael Addition process. Catalysts useful for promoting reactive methylene addition to epoxies include tetraalkylammonium halides and their combinations with alkyl or aryl phosphines.

Michael Addition Thickening

Another reactive thickener type comprises using the reaction between β-dicarbonyl-functional esters and/or polyesters such as those based on acetoacetates with activated olefins such as those based on acrylic-functional polyesters. β-Dicarbonyl-functional esters of this disclosure contain reactive methylene groups convertible to reactive anionic species by selected catalysts, and are hereafter referred to as reactive methylene thickening agents. Pastes containing these thickening agents generate reactively thickened prepregs which can achieve low deformability, desired flexibilities, and high photo-reactivity (by virtue of mature paste polymer structure and the presence abstractable reactive methylene protons) which are key targets of this disclosure.

This thickener technology is based on polymer compositions which achieve rapid chain extension and cross-link development in a continuous process time frame to create solid surface veneer prepreg sheet for cladding existing decorative laminate or custom particle board assemblies to create solid surface counter tops meeting stated commercial performance goals. This thickening chemistry is based on variations of the Michael Addition reaction in which a portion of the paste reactive monomer and reactive unsaturated polymer components are reacted with the reactive methylene thickening agent.

These adducts are new and unique prepolymer compositions capable of providing desired prepreg paste maturation and through-cure performance. This technology can provide mature paste prepregs on a continuous basis. The reactive methylene thickening functionalities can be present in the reactive thickening oligomer as part of a chain, or either side-chain or terminally pendant groups. While not wishing to be bound by theory, the thickening of the prepolymer is thought to proceed through the formation of adducts which are initially comb, star, or chain-extended structures depending on the thickening prepolymer structure. Final prepreg mechanical and photo-cure performance can be adjusted by varying the types and ratio of thickening polymer components.

In this disclosure the term Michael Addition reaction broadly refers to the reaction between a reactive methylene functionality (Michael Donor) and an activated olefin double bond (Michael Acceptor) resulting in a single bond formation between the reactants and loss of the acceptor double bond. Such linkages are further reactive since the second methylene hydrogen of the bond-forming reactive methylene can also be removed to create a new Michael Donor carbanion capable of reacting with a second Michael Acceptor. Thus, methylenes are difunctional with respect to Michael Donor carbanion formation capability. A difference exists between the reaction rates of the first and second reacted methylene hydrogens. Generally, reaction of the first hydrogen occurs at a higher rate than reaction of the second hydrogen due to steric hindrance and other factors. This property allows difunctional acetoacetates to react with di-and higher-functionality acrylates to create chain-extended prepolymers that are capable of forming flexible, tough CIPS prepregs.

Specific to this disclosure are monomers, oligomers, or polymers having constituents containing activated methylene groups capable of conversion to Michael Donor carbanion nucleophiles upon reaction with suitable base catalysts. Non-limiting examples of Michael Donors and Acceptors are listed in U.S. Pat. No. 5,945,489, the entire contents of which are herein incorporated by reference.

Examples of Michael Donors of this disclosure can include β-dicarbonyl-functional esters and polyesters containing malonic and/or acetoacetic functionalities among others. Monomeric Michael reactive thickening agents based on the acetoacetate functionality may contain a single acetoacetate group, as illustrated by their methyl, ethyl, n-butyl, and t-butyl esters. These systems contain two reactive methylene hydrogens and are thus capable of linking Michael acceptor molecules.

Suitable β-dicarbonyl compounds, including β-diketones, β-keto esters and malonates, which are useful for the preparation of the oligomers and polymers used as Michael reactive thickening agents are for example pentane-2,4-dione, hexane-2,4-dione, heptane-2,4-dione, 1-methoxy-2,4-pentanedione, 1-phenyl-1,3-butanedione, 1,3-diphenyl-1,3-propanedione, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid t-butyl ester, acetoacetic acid-(2-methoxyethyl)ester, acetoacetic acid-(2-ethylhexyl)ester, acetoacetic acid lauryl ester, 2-acetoacetoxyethyl acrylate, 2-acetoacetoxyethyl methacrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate, acetoacetate group-containing oligomers and polymers obtained by transesterification of acetoacetic acid ethyl or t-butyl esters with oligomeric or polymeric polyols, and acetoacetate group-containing oligomers and polymers obtained by copolymerisation of 2-acetoacetoxyethyl methacrylate, malonic acid dimethylester, malonic acid diethylester, malonic acid dipropylester, malonic acid diisopropylester, malonic acid dibutylester, malonic acid di(2-ethylhexylester), malonic acid dilaurylester, oligomers and polymers obtained by of dialkyl malonates and diols. Particularly suitable are polymeric diacetoacetates that have been produced by transesterification of unsaturated polyester diols with ethyl, or t-butyl acetoacetate. These include:

1. Diacetoacetates or di(ethylmalonate) functional oligomers produced by transesterification between acetoacetate, or malonate esters with:
    a. Polyester diols produced from polyesterification of aromatic, or aliphatic diacids with diols, ether diols, or polyether diols.
    b. Polyether diols.
    c. Crystalline diols such as hydrogenated bisphenol A.
    d. Cyclopentadiene capped unsaturated polyester diols.
    e. Alkoxylated bisphenol A diols.
    f. Polycaprolactone diols.
2. Higher functional polyacetoacetates or polyethylmalonates produced from tri- and higher-functional polylols of the classes described above.
3. Polymalonate esters produced by diethylmalonate transesterification with diols.

For this disclosure, two types of oligomeric Michael thickening agents have been identified as most typical.

Type-I Michael Donor thickening polyesters contain mid-chain β-dicarbonyl-functional esters that are activated Michael Donor methylene groups capable of undergoing Michael Addition reactions with multifunctional Michael Acceptor molecules to achieve paste thickening. Typical example oligomers of this class are provided below:
  1. 1878-1: Type I Michael thickening resin formed by reacting 5 moles of diethyl malonate with 2 moles of diethylene glycol and 2 moles of dipropylene glycol by ester exchange.
  2. 1878-3: Type I Michael thickening resin formed by reacting 3 moles of diethylmalonate and one mole of fumaric acid with 3 moles of diethylene glycol.

These Type I materials provide rapid thickening under base catalysis in the presence of polyfunctional acceptors such as TMPTA and unsaturated polyesters. Type I thickening polyesters can be prepared with fumarate groups (example 1878-3 above). These resins are self-reactive and exhibit fast thickening rates.

Type II Michael Donor thickening polymers are based on polyester diols or polyols which are capped with acetoacetate functionalities. By way of example, the acetoacetate endgroups of the polyester initially react with the polyacrylate monomer to create acrylate-pendant end groups. As the thickening proceeds, some of the bonded acrylate functionalities are attacked by acetoacetate moieties bonded to other acetoacetate-bearing chains. This process bonds two chains together leading to viscosity-building chain extension. In a parallel process, the remaining interchain reactive hydrogens present in linkages in the chain-extended prepolymer become activated and react with accessible Michael Acceptors to further facilitate cross-linking or polyacrylate functional monomer side-chain attachment. It is believed that the prepolymers developed in this manner have high levels of chain extension and high levels of side-group acrylate functionalities that can provide cross-linking during curing of the prepreg. It is believed that this latter process is the key to achievement of modulus-build needed for the development of high surface hardness (Barcol Hardness) in the resultant cure-in-place composite.

Type I systems components tend to bring desired cross-linking to provide mature prepregs with dimensional stability, including print resistance and small diameter bend capability, while the Type II system components provide toughness due to their chain-extension capabilities.

Additional Type II Michael Donor thickening oligomers having terminal β-dicarbonyl-functionalities greater than two include: propane-1,1,1-triyltrimethyl tris(acetoacetate (AATMP) from Lonza, Inc.

Michael Donor Thickening polymers include free radical addition polymers believed to have side-chain pendant β-dicarbonyl-functionality. Such systems provide CIPS prepreg toughing, flexibility, and crack interception capability allowing bonding of prepreg veneers over low radius curvatures. An example of this type of functionalized acrylate is experimental resin, 7401-172: The resin was produced by free radical polymerization of a 2-ethylhexyl acrylate, 2-acetoacetoxyethyl methacrylate mixture formulated in a 95/5 weight percent ratio. The resulting polymer was diluted by addition of 20 weight percent 1,6-hexanediol diacrylate. This thickening agent resin was most effectively used when chain-extended by reaction with other flexible Michael acceptors and donors before blending and reaction with the remainder of the CIPS prepreg paste.

Subclasses of Type II Michael thickening agents have been identified which create target performance desired CIPS prepreg properties. These include:

Type II Crystalline thickeners: This class is exemplified by hydrogenated bisphenol A diacetoacetate. Paste thickening reactions containing this agent can produce prepregs which have desired stiffness for processing during installation, but sufficient flexibility to allow conformal bending on substrate curvatures. Prepregs containing this agent also can be produced to high surface quality installations requiring minimal finishing. Also, prepreg systems containing this agent exhibit minimal shrinkage on cure as a result of the mature paste polymer microstructure and fast cures to high Barcol Hardness values. These performance benefits appear to be derived from the conformational structure and purity of the hydrogenated bisphenol A structural component of this thickener. In the matured paste, polar and non-bonded interactions between hydrogenated bisphenol A constituents provides modulus to provide stiffening, but the weakness of the interaction allows yield with minimal force. Desirable shrinkage and cure rate effects also have basis in the near-final structure microstructure of the prepreg. Other crystalline diols useful in this approach include: 1,4-dimethylolbenzene, neopentyl glycol, and 1,4-cyclohexanediol.

A second class of Type II Michael donor thickening agents serves as flexibilizing agents to enhance prepreg curvature conformability and toughness. Examples of these may be based on polyester, polyether, and polyurethane diols and other chain-extended systems. Type II flexibilizing agents include:

Polyester flexible Type II Michael donor thickening agents: This class is exemplified by the following oligomer compositions:
1. 1848-10: Michael thickening resin is formed by reacting 4 moles of diethylene glycol with 3 moles of phthalic anhydride to produce a polyester diol which is then reacted with 2 moles of ethylacetoacetate by ester exchange.
2. 1878-12: Is formed by reacting a 1.5 mole per hydroxyl propoxylated bisphenol A diol with 2 moles of ethylacetoacetate by ester exchange.
3. 1878-14: Was formed by reacting 4 moles of diethylene glycol with 3 moles of maleic anhydride to produce a polyester diol. Reacting the diol with cyclopentadiene to produce nadic polyester, and reacting the polyester with 2 moles of ethylacetoacetate by ester exchange.
4. 7418-12: Is formed by reacting polycaprolactone diol (1000 Mw Tone 2221 (Dow)) with two moles of t-butylacetoacetate by ester exchange.

Polyether flexible Type II Michael donor thickening agents: This class is exemplified by the following oligomer compositions:
1. 7418-1: Is formed by reacting polypropyleneoxide ether diol (1000 Mw Poly G 55-112 (Arch Chemicals)) with two moles of t-butylacetoacetate.
2. 7418-121: Is formed by reacting polypropylene glycol diol (425 Mw Arcol Polyol PPG 425) with two moles of t-butylacetoacetate.

Polyurethane flexible Type II Michael donor thickening agents: This class uses the diverse range of polyurethane diols that can be prepared form available polyisocyanates and diols. Preferred are polyurethane diols prepared from aliphatic diisocyanates, such as isophorone diisocyanate (IPDI) and hydrogenated diphenylmethane diisocyanate (HMDI). Aromatic diisocyanates are an option for use in for urethane flexible thickening agents for prepregs based on yellow- or charcoal-colored fillers.

Diols useful in the preparation of Type II donors include: polyester diols based on diacid-diol condensations as well as polyester diols based on diol extensions using caprolactone, polyether diols (polyalkyleneoxide diols based on diol extensions using propylene oxide, ethylene oxide), and their mixed systems; polyether polyols based on diol extensions using ring-opening polymerization of tetrahydrofuran; crystalline diols of the type described above. The urethane diols described above can be reacted with t-butyl acetoacetate to produce the target Type II Michael donors systems. It must be noted that all free isocyanate groups must be extinguished prior to the acetoacetate ester exchange since residual dibutyltin dilaurate catalyst and isocyanate groups will result in product thickening and gelation through the Michael Donor isocyanate reaction.

Monofunctional Michael Acceptors—Included in this group are alkyl acrylates having methyl, ethyl, propyl, isopropyl, n-butyl, iso-butyl, t-butyl, ethylhexyl, isobomyl groups, and the like. These materials may be added at any point in the paste forming, or maturation periods and as reactive diluents to aid processing and as mobile reactants to facilitate the reactive prepreg paste maturation process or the final free radical prepreg conversion to solid surface veneer. This Michael Acceptor class also moderates cross-linking and chain extension processes in paste thickening process by acting as capping agents.

Monofunctional and poly-functional methacrylates esters having the same constituents as the stated acrylates of this disclosure undergo Michael Addition at slower rates and may have higher rate of survival in the paste thickening stage, but maintain the stated benefits to the final cure stage.

A second monomeric Michael Acceptor class is alkyl fumarates. These may be simple alkyl esters, or may be the disubstituted analogs of unsaturated carboxylic acids, such as fumaric acid, using diethylmalonate or diacetoacetate.

Polyfunctional Michael Acceptors—Based on oligomeric di-or higher-functional acrylates: Of course, these oligomers and poylmers to be discussed can serve as the reactive material in the polymerizable component. Contained in this class are:

Alkyl difunctional acrylates: This group includes diacrylates functional derivatives based on C-1 to C-15 primary, secondary, and tertiary aliphatic diol combinations. Members of this class include: 1,6-hexanediol diacrylate, 2-methyl-1, 3-propane diacrylate, 2,2'-dimethyl-1,3-propane diacrylate, and the like.

Crystalline diacrylates: This group includes diacrylates derived from crystalline diols. This class is exemplified by hydrogenated bisphenol A diacrylate. Paste thickening reactions containing this agent can produce prepregs which have desired stiffness for processing during installation, but sufficient flexibility to allow conformal bending on substrate curvatures. Prepregs containing this agent also can be produced to high surface quality installations requiring minimal finishing. Also, systems containing this agent exhibit minimal shrinkage on cure as a result of the mature paste polymer microstructure and fast cures to high Barcol Hardness values. These performance benefits appear to be derived from the conformational structure and purity of the hydrogenated bisphenol A structural component of this thickener. In the matured paste, polar and non-bonded interactions between bisphenol A constituents provides modulus to provide stiffening, but the weakness of the intermolecular interactions allows yield with minimal force. Desirable shrinkage and cure rate effects also have basis in the near-final structure microstructure of the prepreg. Other crystalline diols useful in this approach include: caprolactone extensions of hydrogenated bisphenol A, hydrogenated aralkyl-functional derivatives of bisphenol A such a those produced from styrene and alkylstyrene substitutions, hydrogenated 2,6-naphthalenediol, 1,4-dimethylolbenzene, neopentyl glycol, 1,4-cyclohexane diol and diols derived from dicyclopentadiene, alkoxylated bisphenol A, acrylic vinylesters, diisocyanate adducts with 2-hydroxyethylacrylate (1:2 stoichiometry) and diisocyanate adducts with 2-hydroxyethylacrylate (1:1 stoichiometry) further reacted with crystalline diols.

Flexible diacrylates: This group includes urethane diacrylates, polyester diacrylates, and polyether diacrylates.

Flexible urethane diacrylates: This class uses the diverse range of polyurethane precursors including polyisocyanates, diols, and monohydroxyl-functional acrylates. Polyurethanes useful for preparation of flexible urethane diacrylates include aliphatic diisocyanates such as isophorone diisocyanate (IPDI) and hydrogenated diphenylmethane diisocyanate (HMDI). Aromatic diisocyanates are an option for use in urethane flexible thickening agents for prepregs based on some colored fillers capable of masking, or complimenting the slight yellowing observed with aromatic diisocyanate usage. Useful diols for preparation of flexible urethane diacrylates include polyester diols based on diacid-diol condensations as well as polyester diols based on diol extensions using caprolactone, polyether diols including polyalkyleneoxide diols based on diol extensions prepared using propylene oxide, ethylene oxide, and their mixed systems; polyether polyols based on diol extensions using ring-opening polymerization of tetrahydrofuran; crystalline diols of the type described above. These diols can be reacted with diisocyanates in offset stoichiometries to provide either isocyanate or hydroxyl terminal polyurethanes. Hydroxyl-terminal polyurethane systems can be acrylated using direct acrylic acid esterification, by transesterification with acrylic monoesters, including t-butyl acrylate, or acrylic anhydride. Isocyanate-terminal polyurethanes can be reacted with mono-functional acrylates (2-hydroxyethylacrylate) in a post reaction stage to achieve acrylic capping.

Flexible polyester diacrylates: This class is based on diols prepared from diacid-diol condensations or by diester-diol transesterification as well as from polyester diols based on diol extensions using caprolactone. These systems can be substituted with acrylates by reaction of their hydroxyl groups with acrylic anhydride, by transesterification using activated acrylates such as t-butyl acrylate or by reaction with acryloyl chloride. Diacrylates of this type can be used to form tough, flexible CIPS prepregs.

Flexible polyether diacrylates: This class is based on polyether diols prepared by diol extensions using alkylene oxides or from polytetrahydrofuran diols. These may be acrylate-substituted by direct esterification using acrylic acid, acryloyl chloride, or acrylic anhydride, or by transesterification of methyl-, ethyl-, or t-butyl acrylic esters. A member of this class is SR610, polyethylene glycol diacrylate, produced by Sartomer Company, Inc.

Tri- and higher-functional acrylates: This class is based on star polyols such as trimethylolpropane, pentaerythritol, and linear triols such as glycerin. These acrylates are key to maintenance a high reactive olefin concentration in the mature prepreg, which is key to free radical cure speed and final composite cross-link density-based hardiness and strength on cure.

Crystalline tri- and higher-functional acrylates: This class of Michael Acceptor is based on crystalline monomers which produce modulus build in matured CIPS paste prepregs, but provide latent flexibility on stress without failure. Members of this class include Sartomer 368, tris(2-hydroxy ethyl)isocyanurate triacrylate from Sartomer Company, Inc. and methylolmelamine polyfunctional acrylates.

Unsaturated polyesters: This class of Michael Acceptor is based on unsaturated polyesters derived from combinations of unsaturated diacids or their anhydrides (such as fumaric acid or maleic anhydride), aliphatic or aromatic diacids or their anhydrides, and a range of diols including ethylene glycol, propylene glycol, diethylene glycol, dipropylene glycol, neopentyl glycol, 2-methyl-1,3-propanediol, 1,3-propanediol, and other diols. The unsaturated polyesters useful in this disclosure are designed by controlling stoichiometry to yield polyesters with low carboxyl numbers. This is necessary in order to minimize the use of high levels of basic catalyst, which can adversely affect final composite properties. Residual carboxyl content may be further controlled by use of reactants such as dialkyl- or diarylcarbodiimides or by other carboxyl-reactive agents. The reactivity of unsaturated polyesters can be modulated by partial reduction of unsaturation levels by reaction of the polyester with cyclopentadiene.

Michael Catalyst Systems.

Catalysts for Michael Reaction include those capable of converting reactive methylenes to nucleophiles capable of bond formation with activated olefins. This group includes one or combination of several of:

1. Group I and II metal: (1) hydroxides, (2) hydrides, (3) carbonates, (4) alkoxides or phenoxides, (5) amides, such as those produced by metal reaction with ammonia, amines, or amides, (6) salts containing anions of reactive methylenes compounds such as those derived from methylenes α to electron-withdrawing groups (including: nitrile, sulfonate, sulfoxide, sulfate, sulfone, nitro, carboxyl, (tri-, di-, and mono-) halocarbon, carbonyl, etc.

2. Strong organic bases: (1) amines, (2) amidines and their salts (such as DBU and 1,8-diazabicyclo[5.4.0]undec-7-ene formate or octanoate), (3) guanidines, (4) ammonium, alkylammonium, arylammonium or alkylarylammonium hydroxides, (5) ammonium, alkylammonium, arylammonium or alkylarylammonium fluorides, (6) ammonium, alkylammonium, arylammonium or alkylarylammonium alkoxides, (7) ammonium, alkylammonium, arylammonium or alkylarylammonium phenoxides, (8) alkyl-, aryl-, or alkylaryl-substituted t-phosphines.

3. Catalyst system comprised of quaternary salt and epoxy moiety (such as glycidyl methacrylate, trimethylolpropane triglycidyl ether, diglycidyl ether of bisphenol A and the like). The quaternary salts include: (1) alkylammonium or alkylarylammonium halides, (2) phosphonium halides, (3) phosphonium acetates, (4) ammonium, phosphonium or sulfonium fluorborate.

Michael Reaction catalysis in CIPS paste applications is different than in unfilled reactions. Catalysts such as aqueous sodium hydroxide in some cases fail to initiate reaction. In contrast, the same resins show fast reaction rates in the presence of fillers such as ATH. While not wishing to be bound to theory, it can be speculated that the aqueous catalyst becomes encapsulated in a second phase and unable to participate in the desired reaction catalyisis. When an appropriate filler is used, it serves as a catalyst dispersant and transfer agent allowing the formation of reactive Michael donor anions from the reactive methylene-containing components in the mix.

This phenomenon renders neat, aqueous, and alcoholic solutions of highly polar salts to become effective in the desired paste thickening reaction.

Cure-in-place prepreg systems lend themselves to efficient modification with other additives capable of imparting desired decorative patterns simulating granite and other naturally occurring decorative solid surface materials. These additives offer domain variations based on size, shape, color, translucency, and orientation. Additive materials may be crystalline, plate structures like mica, amorphous minerals such as glass flake, or any range of ground minerals including granite, or quartz. The synthetic and natural minerals and glasses are available in varied colors imparted by trace impurities or by thin and monolayer surface depositions of color or reflectance-producing agents. Similarly, polymeric flake materials are available with dye or pigment modification to achieve desired color effects and/or reflectivity from metal deposition and the like. These additives can also be produced from polymer-bonded fillers which can be variations on the mineral- and polymer-based additives described above.

In addition to the above listed components, the photocurable and thermosettable compositions used herein can contain components normally used in thermosettable resins including fibers, biocides, tougheners, plasticizers, pigments, wetting agents and the like.

Composition for forming the prepreg comprising;
1. a thermosettable resin or prepolymer,
2. a reactive material,
3. a photoinitiator activated in visible light, a peroxide or mixtures thereof,
4. a filler,
5. a cure rate enhancer,
6. a reactive thickening agent,
   optionally a shelf-life extender.

Typically the amounts of the various components in the compositions from which the prepregs are obtained are as follows wherein the ranges are given in weight percent of the total composition:

A. The polymerizable component is typically about 15 to about 55 percent and more typically about 25 to about 45 percent;
B. The filler component is typically about 45 to about 85 percent, and more typically about 50 to about 75 percent; and
C. The additive component is typically about 0.2 to 3 percent, and more typically about 0.3 to about 2 percent.

For cross linked CIPS prepreg containing a reactive thickener, the polymerizable component A comprises the following components and amounts:
1. a reactive material typically in amounts of about 30 to about 90 more typically about 40 to about 85 percent; and
2. a reactive thickening agent typically in amounts of about 10 to about 70 percent, and more typically about 15 to about 60 percent.

Please note that in some embodiments a component, e.g. one containing active olefin component can act as both a thickening agent participating in the thickening stage and as a curing agents in the final cross linking cure stage. Also, please keep in mind that thermoplastics such as poly methylmethacrylate do not participate in the final cross linking cure stage but can be employed in the compositions.

The more typical ranges of the components in the polymerizable component may differ depending upon the particular type of reactive thickening agent.

For example, for a CIPS prepreg containing a reactive Michael thickener and optionally a reactive thermoplastic polymer, the polymerizable component A comprises the following components and amounts:
1. an optional reactive thermoplastic resin component typically in amounts of 0 to about 70 and more typically 0 to about 60 percent
2. a reactive material typically in amounts of about 20 to about 90 and more typically about 30 to about 80 percent; and
3. a reactive thickening agent typically in amounts of about 5 to about 70 and more typically about 5 to about 60 percent.

A typical example is shown in the table below:

| 7428-71-1 | | | | |
|---|---|---|---|---|
| No. | Component | gm. | % | Description |
| 1 | 1878-4 | 2.00 | 4.47 | Michael Donor |
| 2 | TMPTA | 6.00 | 13.40 | Michael Acceptor |
| 3 | 40% NaOH | 0.05 | 0.11 | Michael Catalyst |
| 4 | GE 241 | 15.00 | 33.50 | Filler |
| 5 | SR610 | 2.00 | 4.47 | Acrylic Polyether |
| 6 | GE 241 | 16.00 | 35.47 | Filler |
| 7 | I-819 | 0.37 | 0.83 | Photoinitiator |
| 8 | L-256 | 0.30 | 0.67 | Peroxy Ester |
| 9 | 40% NaOH | 0.05 | 0.11 | Michael Catalyst |
| 10 | 914 VE | 3.00 | 6.70 | Vinyl Ester |
| | Total | 44.77 | 100.00 | |

All components defined hereinafter

Component 1 is the reactive thickening agent (15.4% of the total resin).

Component 2 is the reactive material (46.1% of the total resin).

Components 5 and 10 are unsaturated reactive thermoplastic resins (38% of the total resin). SR 610 is a polyether diacrylate, 914 VE is an acrylic vinyl ester made from a diepoxy (E 828) and acrylic acid.

For a CIPS prepreg containing a reactive urethane thickener and optionally a reactive thermoplastic polymer, the polymerizable component A comprises the following components and amounts:
1. an optional reactive thermoplastic resin component typically in amounts of 0 to about 60 and more typically 0 to about 30 percent;
2. a reactive material typically in amounts of about 20 to about 90 and more typically about 30 to about 80 percent; and
3. a reactive thickening agent typically in amounts of about 5 to about 70 and more typically about 5 to about 60 percent.

A typical example is shown in the table below:

| 7428-47 | | | | |
|---|---|---|---|---|
| No. | Component | gm. | % | Description |
| 1 | TMPTA | 6.00 | 23.20 | Reactive Monomer |
| 2 | D N330A | 2.00 | 7.73 | Polyisocyanate |
| 3 | Vorinol 800 | 1.00 | 3.87 | Activated Polyol |
| 4 | Zolidine MS | 0.50 | 1.93 | Water Scavenger |
| 5 | I-819 | 0.18 | 0.70 | Photoinitiator |
| 6 | T-12 | 0.18 | 0.70 | Urethane Catalyst |
| 7 | GE 241 | 16.00 | 61.87 | Filler |
| | Total | 25.86 | 100.00 | |

All components defined hereinafter.
Component 1 is the reactive material (66.6% of total resin)
Components 2 and 3 are the reactive thickening agent (33.3% of total resin)
Components 3 is a tetra-ol monomer derived from ethylene diamine and ethylene oxide.
For thermoplastic CIPS prepreg containing a reactive epoxy CIPS thickener and optionally a reactive thermoplastic polymer, the polymerizable component A comprises the following components and amounts:
1. an optional reactive thermoplastic resin component typically in amounts of 0 to about 60 and more typically 0 to about 30 percent;
2. a reactive material typically in amounts of about 20 to about 90 and more typically about 30 to about 80 percent; and
3. a reactive thickening agent typically in amounts of about 5 to about 70 and more typically about 5 to about 60 percent.

A typical example is shown in the table below:

| 7428-66 | | | | |
|---|---|---|---|---|
| No. | Component | gm. | % | Description |
| 1 | E828 | 5.00 | 9.21 | Epoxy Monomer |
| 2 | SR610 | 2.00 | 3.68 | Acrylic Polyether |
| 3 | GE 241 | 14.00 | 25.78 | Filler |
| 4 | DETA | 0.50 | 0.92 | Polyamine |
| 5 | TMPTA | 5.00 | 9.21 | Michael Acceptor |
| 6 | DETA | 0.50 | 0.92 | Polyamine |
| 7 | GE 241 | 10.00 | 18.42 | Filler |
| 8 | TMPTA | 5.00 | 9.21 | Michael Acceptor |
| 9 | GE 241 | 10.00 | 18.42 | Filler |
| 10 | E828 | 2.00 | 3.68 | Epoxy Monomer |
| 11 | I-819 | 0.30 | 0.55 | Photoinitiator |
| | Total | 54.30 | 100.00 | |
| | % Filler | | 62.62 | |

For a castable prepreg paste the polymerizable component A comprises the following components and amounts based upon the total composition:
a. a thermosettable resin or prepolymer typically in amounts of about 3 to about 20 percent and more typically about 3 to about 15 percent;
b. a reactive material typically in amounts of about 5 to about 30 and more typically about 10 to about 20 percent;
c. a reactive thickening agent from the group including:
   i. a Michael Addition reactive thickener comprised of a β-dicarbonyl reactive methylene Michael Donor in amounts of about 3 to about 25 percent and more typically about 5 to about 20 percent; and an activated olefin-functional Michael Acceptor typically in amounts of about 4 to about 25 and more typically about 6 to about 20 percent ; or
   ii. an epoxy reactive thickener comprised of an epoxy functional monomer, or oligomer typically in amounts of about 3 to about 25 percent, and more typically about 5 to about 20 percent; and an epoxy reactive monomer or oligmer typically in amounts of about 1.5 to about 20 percent and more typically about 2 to about 15 percent; or
   iii. an isocyanate-functional reactive thickener comprised of a polyisocyanate or polyisocyanate capped oligomer typically in amounts of about 2.5 to about 25 percent and more typically about 5 to about 20 percent and an isocyanate reactive monomer or oligomer typically in amounts of about 2.5 to about 25 percent; and more typically about 5 to about 20 percent, The additive component C of the compositions from which the prepregs are obtained typically comprises the following components and amounts:
a. an initiator component comprising based upon the total composition:
   i. a photoinitiator typically in amounts of about 0.001 to about 0.2 and more typically about 0.002 to about 0.15 percent ; and typically be visible light activated, or
   ii. a peroxide typically in amounts of about 0.05 to about 1 and more typically about 0.05 to about 0.5 percent; or
   iii photoinitiator-peroxide mixtures typically in amounts of about 0.001 to about 0.2, more typically about 0.002 to about 0.14 percent and even more typically about 0.009 to about 0.1 percent;
b. a reactive thickener catalyst specific to,
   i. a Michael Addition reactive thickening catalyst typically in amounts of about 0.025 to about 0.25 and more typically about 0.05 to about 0.15 percent; or
   ii. an epoxy reactive thickening catalyst typically in amounts of about 0.1 to about 2 percent and more typically about 0.1 to about 1.5 percent; or
   iii. an isocyanate-functional reactive thickening catalyst typically in amounts of 0.1 to about 2 and more typically about 0.2 to about 1.5 percent;
c. optionally an air-release/wetting agent component and when employed such is typically in amounts of about 0.5 to about 1.5 and more typically about 0.1 to about 1 percent;
d. optionally a stabilizer component and when employed such is typically in amounts of about 10 to about 600 ppm and more typically about 20 ppm to about 400 ppm based upon the reactive monomer component; and
e. optionally a flexibilizing component and when employed such is typically in amounts of about 2.to about 25 and more typically about 2.5 to about 20 percent.

The wetting agents are typically highly polar species capable of lowering interfacial surface film interactions which interfere with bubble coalescence and growth, and ultimate egression from the CIPS paste by degassing processes. Examples include materials such as BMC 806 described herein. Typically these additives contain a polar surface active carrier solvent such as an aliphatic ketone (i.e. methylethyl ketone) and lesser amounts of a secondary surface tension lowering agent such as an alkoxy siloxane.

The prepregs can be prepared by a number of different methods. In the direct mix method a thermoplastic paste is prepared using typical bulk molding preparation techniques. A high viscosity thermosettable resin and a low volatile reactive monomer, such as TMPTA, are combined using high torque mixing at ambient temperature. The remaining ingredients are added and mixed until combined and no visible entrained air bubbles remain. Release of entrained air can be facilitated by use of vacuum. A prepreg sheet is then formed between two film layers. Because oxygen in many cases inhibits the crosslinking reaction of the thermosettable prepreg, one of the films should be oxygen permeable to help increase the shelf life of the prepreg castable sheet. However, there are prepreg systems according to the present disclosure that exhibit a degree of natural oxygen barrier performance in the prepreg face formed on the Mylar carrier sheet. These systems cure quickly under sunlight. It is believed that the tightness of the prepreg surface and its composition are factors. Example 7B (attached) is a rigid-flexible class of CIPS prepreg which readily cures under sunlight to a Barcol number >50 in a cure period of <30 minutes without the benefit of an oxygen barrier film.

An example of an apparatus for forming the plastic prepreg sheet between two film layers is shown in FIG. 1. In FIG. 1 the batch mixer or screw extruder can be modified so as to allow the application of a vacuum during mixing.

Another method of preparing a prepreg, the cast method, involves the use of a castable polymer mixture containing a reactive, low viscosity monomer. Addition of subsequent components can be simultaneous or sequential. An example of a sequential addition would be as follows. Filler, such as ATH, is added to the prepolymer mixture with mixing. A wetting agent is then added to the mixture to aid in releasing trapped air. Release of entrained air is facilitated by the use of vacuum and vibration. Photoinitiators, peroxides, reaction enhancing additives and other additives can be added at this point with mixing and the mixture degassed. Maturation/thickening prepolymers or associative thickeners are then added, and then the mixture is degassed.

The degassed paste can then be mixed at ambient, or at a slightly elevated temperature (e.g.25-45° C.) to permit paste maturation to the castable stage. This stage is the point in the paste maturation process at which the paste will after casting proceed to a serviceable prepreg with this characteristic being defined by the set-time required to be handleable, as well as prepreg mechanical, flexibility, and other desirable prepreg performance requirements. The staging of the paste maturation can facilitate achieving desirable properties in the prepreg. For instance, examples included in the application demonstrate the pre-reaction of chain extendable Michael donors and acceptors leading to enhanced flexibility, toughness, and craze-cracking resistance all of which are desirable to installation and final performance of the CIPS veneer solid surface composites.

Figure 2:
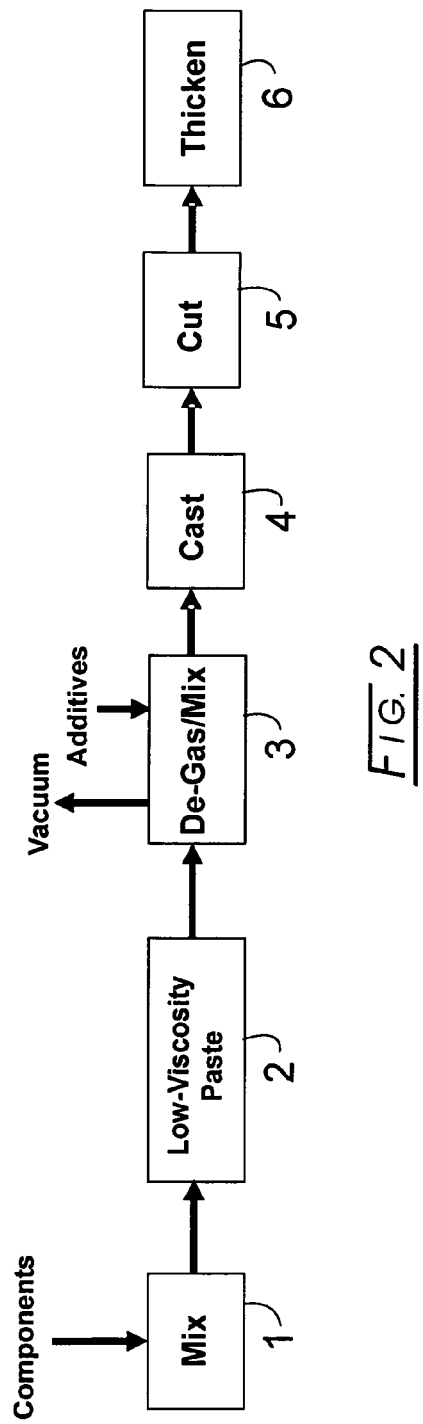
FIG. 2 is a schematic representation of a castable prepreg process.

The mixture can then be cast onto a film using conventional moving belt/doctor blade methods, and covered with a second film. Typically, the cast sheet is formed to a desired thickness, cut, and allowed to mature into a dimensionally stable prepreg. In one option the paste is allowed to thicken prior to addition of a release film. The process can be carried out in a batch or continuous process. A schematic representation of the castable prepreg process is shown in FIG. 2. A continuous process for making prepreg depends on having a fast-thickening reaction capable of generating sheet prepreg having desired properties in a short period of time. It has been found that concentrated sodium hydroxide is capable of catalyzing the resins of this disclosure at rates conducive to a commercially desirable continuous process. While other catalysts such a potassium hydroxide, and organic bases such as DBU do not achieve prepreg paste thickening rates seen using the caustic system at ambient temperatures. It is believed that the ATH acts as a co-catalyst in combination with the caustic to give rise to polymers not easily achieved by other methods.

An auxiliary catalyst useful in the continuous process is prepared by reacting diethylmalonate with sodium hydroxide. This catalyst is the sodium salt of the Michael Addition monomer. It appears to provide a mobile catalyst component which mitigates the need for agitation during advancement of the prepreg paste. Prepreg pastes prepared without the auxiliary catalyst component must be vigorously agitated as they thicken. By using the auxiliary catalyst, the pastes can be cast at lower levels of advancement since it is believed the mobile catalyst allows anion-generation at new sites at a quicker rate. In some instances, without the auxiliary catalyst, the loss of mobility in the polymer system resulting from molecular weight build up stops or slows the reaction at normal room temperatures. This is undesirable in a continuous process. In this case, the maturing paste at casting can be made capable of accelerated maturation by heating in order to meet continuous process manufacturing rate targets.

Figure 3:
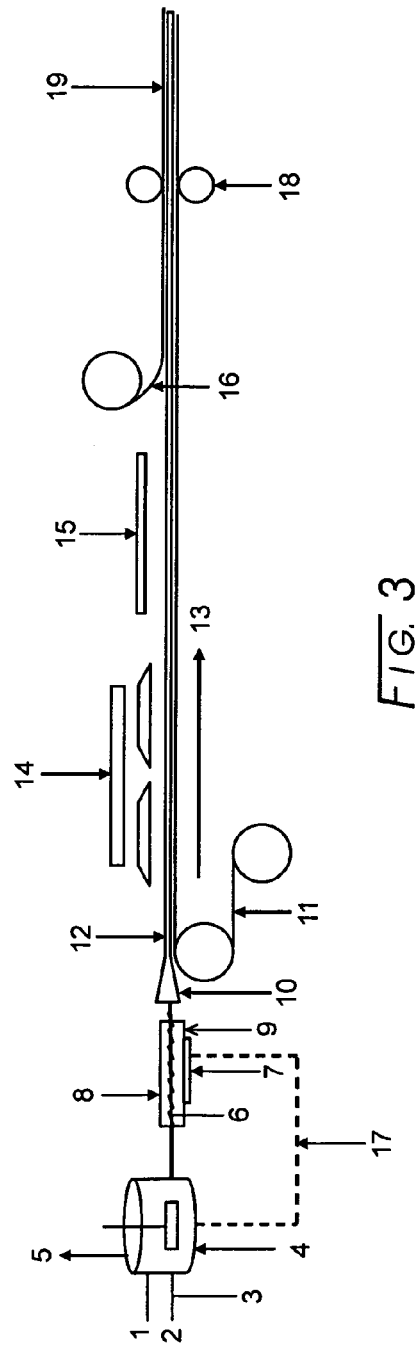
FIG. 3 is a schematic representation of a continuous castable prepreg process including the features:
1. Filler
2. Pre Polymer
3. Additives (With Partial Catalyst)
4. Partially Advanced Pre Paste
5. Vacuum Void Elimination By Gas Removal
6. Final Catalyst Charge
7. Vibratory Mixer
8. Continuous Mixer: Prepreg Paste Final B-Stage Development
9. Agitator (Screw, Or Other Similar Design)
10. Early B-Stage Prepreg Paste Transfer to Carrier Film (Slit-Die, Doctor-Box, Or Other)
11. Carrier Film
12. Early B-Stage Prepreg Paste Coated on Carrier Film.
13. Coating Roller Rotation Direction
14. Coating Line Heating Section
15. Coating Line Cooling Section
16. Release Film Placement
17. Thin B-Stage Paste With Immature Paste To Prevent Over-Advancement
18. Nip Rollers To Refine Prepreg Thickness Uniformity
19. Finished Prepreg: Roll, Or Slice and Stack For Final Maturation To Print-Free prepreg

The auxiliary catalyst fulfills another role in the prepreg development. The Type II thickening resins are typically acetoacetate-capped polyesters. These materials undergo Michael-Addition thickening via polyacrylate chain extensions in which two or more different Type II resin chains undergo Michael Addition with the same polyfunctional acrylate. Under the high pH required for this reaction the acetoacetate capping groups undergo color-body formation reactions (aldol condensations and the like). It is believed that coloration is related to the presence of metallic impurities produced in the poly-functional acetoacetate derivatives during processing at elevated temperatures in high-alloy metal reactor systems. For instance, good sustained color performance is attained in prepregs produced with Michael donors produced in glass, or at low temperatures. It is believed that the malonate color improvement effect may come from its ability to preferentially complex with the metal ions responsible for catalyzing color formation reactions (aldol condensations and the like). Accordingly, the use of auxiliary catalyst decreases the potential for colored by-product formation. A schematic representation of the continuous cast process is shown in FIG. 3.

The continuous cast process for producing the prepreg involves a rapid thickening (B-staging) of the prepreg prepolymer component. This is believed to involve a selective Michael Addition reaction involving Michael Donor polyesters and the Michael Acceptor components of the prepolymer resin system. This process is facilitated by using selected basic catalyst combinations which provide a desired combination of reaction speed and B-stage polymer morphology. The resultant B-staged prepolymer provides a prepreg structure having aesthetic, handling, and latent cure properties which include: tear-resistance, toughness, compression-resistance, low color levels, dimensional stability, and target cured prepreg performances (mechanical strength, toughness, color stability, high cure rate and depth-of-cure). The thickening or B-staging process proceeds at a rate conducive to commercial process timing to yield a sheet product capable of being delivered in sheet, or roll form.

The continuous cast process involves mixing filler and the prepolymer system composed of the Michael Thickening (donor) and the activated vinyl Michael (acceptor) plus the additive package with a portion of the Michael addition catalyst component. The immature paste has a low viscosity allowing degassing by vacuum, vibration, settling, or a combination of these methods. The degassed paste is catalyzed in a maturation reactor to a point where the viscosity is allowed to build to a level required for paste casting. Mixing during this process is accomplished using ultrasonic or mechanical mixing designed to minimize void generation. The target paste film coating viscosity is maintained in the maturation reactor by using a continuous addition of intermediate maturity paste to stabilize viscosity build. The paste at film coating viscosity is transferred to a vessel suitably designed to allow fluid coating on the carrier film by a number of possible process configurations including roller-transfer, doctor box, etc. The coating line is designed to allow heating of the coated film to accelerate the viscosity build of the paste. The use of other mobile catalysts such as DBU with the auxiliary catalyst provides enhanced thermal advancement of the paste on the maturation line which is needed for high process throughput without adversely affecting the room temperature film coating paste stability. The use of other mobile catalysts such as DBU with the auxiliary catalyst provides enhanced thermal advancement of the paste on the maturation line which is desirable for high process throughput without adversely affecting the room temperature film coating paste stability. The refined catalyst combination provides prepreg advancement to a highly desirable crosslink density (needed for dimensional stability) and coated paste flexibility (needed for installation surface conformability). The matured paste-film composite passes through a cooling section and the release film is added. The product may be rolled, or slit laterally for stacking in uniform sheet lengths.

In a variation of the above methods, prepreg pastes which are thickened to thermoplastic prepregs consistency, that are nearly print free, can be prepared using Michael Addition chemistries from the castable prepreg method. In Example 8 a cast method prepreg formulation was modified by raising its filler loading. Advancement of the system to form a plastic paste was accomplished by incremental addition of caustic followed by kneading. The thickened plastic paste could be formed into a ball and compressed into a 100 mil thick sheet.

The disclosure provides methods of preparing solid surface cure-in-place articles useful in commercial applications such as floor and wall tiles, counter tops, tub surrounds cabinet facings, sinks and bath tubs from the afore mentioned prepregs. According to the disclosure the prepregs are cured to a desired hardness and strength using a radiation cure process. The radiation source can be ambient light or an enhanced visible light source such as a halogen lamp and/or IR radiation with the IR (heat) contribution being a critical component needed for attainment of desired cure depth and cross-link density. The latter method also provides ease-of-cure to more optically dense prepreg systems. A key element of this system is the cure rate enhancement resulting from IR heating of the composite. This effect can be further supplemented by heating the composite to speed the exotherm development once the radiation source is applied. The room temperature white light CIPS cure system can be improved by using a 500 watt halogen light cure. When the halogen light is used, the strength performance of coupons produced is significantly higher. When the optical density is too great for appreciable photoinitiation, the peroxide-based initiation, supplemented by cure rate enhancing additives, takes over. The combined thermal/photocure is desirable to achieve maximum cure potential in the system, although too rapid of a heating can result in a brittle product as a result of internal stress developed as a result of differential cure rates.

In prepreg systems such as unsaturated polyester-acrylic system that are inhibited by the presence of oxygen, sheeting material impervious to oxygen such as Mylar® can be used as the carrier membrane in the prepreg production. A prepreg covered in this manner cures rapidly on exposure to radiation since the prepreg photoinitiator system generates radicals which deplete the inhibiting oxygen, and the film prevents infusion of fresh oxygen. In cases where the prepreg has a complex configuration, a liquid based film forming solution or emulsion not reactive with the prepreg can be applied to an exposed surface. The coating is then allowed to cure to an oxygen-impermeable coating. An example of such a material includes aqueous polyethylene vinyl acetate (EVA) emulsions. These EVA emulsions are readily available commercially as wood glues. The emulsions can be applied by spraying, brushing, etc.

The prepregs can be formulated to look like marble, slate, granite, cultured marble, other stone types, etc. when cured. The cured prepregs can be used as a veneer cladding for any rigid substrate. The thickness of the solid surface cladding is typically from 90 to 160 mils. Alternatively it can be from 100 to 150 mils. The uncured, mature prepreg can be bonded to a substrate and cured in place or cut to fit, cured and then attached to a substrate. The cured prepreg can be attached to a substrate by any appropriate means. Examples of said means include adhesives in general, including epoxy and urethane based adhesives; two faced adhesive tapes in both sheets and strips; partially cured rubber tapes such as PLIO-SEAL® brand tape, commercially available from Ashland Inc. or mortar.

Having thus described the disclosure the following examples are provided for illustration purposes and should not be deemed as limiting the scope of the disclosure.

Definition of compounds

AATMP: LONZAMON® AATMP, propane-1,1,1-triyltrimethyl tris(acetoacetate) from Lonza, Inc.

Aerosil® 100: fumed silica from Degussa.

Aerosil® 200: fumed silica from Degussa

Auxiliary catalyst: prepared by reacting diethylmalonate with 50% NaOH.

Blue Pigment: Phthalo blue RS from Polytrend Industrial Colorants

BMC 806: Air release BMC 806, mixture of 2,6-dimethyl-4-heptanone and 4,6-dimethyl-2-heptanone from Bergen Materials Corp.

CN968: Sartomer CN968 urethane acrylate, aliphatic polyester-based urethane hexaacrylate oligomer from Sartomer Company, Inc.

DBU: 1,8-diazabicyclo[5.4.0]undec-7-ene

DETA: diethylenetriamine

DMAEMA: 2-dimethylaminoethylmethacrylate

D N330A: Desmodur® N330A: Aliphatic polyisocyanate (HDI trimer) from Bayer Material Science.

CN 120: Epoxy diacrylate

E828: EPON™ 828 from The Dow Chemical Company.

EAA: ethyl acetoacetate

GE 241: Granite Elite® 241 from J.M. Huber Corporation, Huber Engineered Materials $H_2BisA$: hydrogenated bisphenol A diacetoacetate HDDA: hexanediol diacrylate Irgacure® 819: bis(2,4,6-trimethyl benzoyl) phenyl phosphine oxide from Ciba Specialty Chemicals I-819: Irgacure® 819 12% in SR285.

Lupersol 256: 2,5-dimethyl-2,5-di-(2-ethylhexanoylperoxy) hexane from Atofina Chemicals, Inc.

L-256: Lupersol 256

Mod M: magnesium oxide thickening agent provided by Plasticolors, Inc.

OE 431: Onyx Elite® 431: alumina trihydrate filler from J.M. Huber Corporation, Huber Engineered Materials PDO: Luperox® 26M50, 50% t-butyl peroxy-2-ethylhexanoate in odorless mineral spirits PI-2: Darocure 1173/Genocure TPO (80/20%)

PMMA poly(methyl methacrylate) ELVACITE® 2044 produced by: Lucite International, Inc.

Q6585: unsaturated polyester from a mixture of diols and maleic anhydride from Ashland Performance Materials Thiourea: 1-acetyl-2-thiourea T-12: dibutyltin dilaurate TMPDE: trimethylolpropane diallyl ether 80. 2,2-bis(allyloxymethyl)-butan-1-ol from Perstorp Specialty Chemicals AB.

TMPTA: trimethylolpropane triacrylate, Sartomer 351, from Sartomer Company, Inc.

TS: trimethylolpropane tris(3-thiopropionate)

914 VE: Vinyl ester formed from EPON™ 828 and acrylic acid.

Vorinol™ 800: aliphatic amine-initiated polyol from The Dow Chemical Company.

ZOLIDINE® MS-PLUS: Oxazolidine (3-ethyl-2-methyl-2-(3-methylbutyl)-1,3-oxazolidine) moisture scavenger from ANGUS Chemical Company.

SR247: Sartomer 247, neopentyl glycol diacrylate from Sartomer Company, Inc.

SR285: Sartomer 285, tetrahydrofurfuryl acrylate from Sartomer Company, Inc.

SR349: Sartomer 349, ethoxylated (3) bisphenol A diacrylate from Sartomer Company, Inc.

SR368: Sartomer 368, tris(2-hydroxy ethyl)isocyanurate triacrylate from Sartomer Company, Inc.

SR415: Sartomer 415, ethoxylated (20) trimethylolpropane triacrylate from Sartomer Company, Inc.

SR506: Sartomer 506, isobornyl acrylate from Sartomer Company, Inc.

SR610: Sartomer 610, polyethylene glycol (600) diacrylate, from Sartomer Company,. Inc.

SR9035: Sartomer 9035, ethoxylated (15) trimethylolpropane triacrylate from Sartomer Company, Inc.

TMPTA/AROPOL™ 7221 (30%/70%): 30% TMPTA/70% AROPOL™ 7221 Plastic.

7221: AROPOL™ 7221 Plastic.

1878-1: The polymalonate formed from 5 moles of diethylmalonate, 2 moles of diethylene glycol and 2 moles of dipropylene glycol.

1878-4: Diacetoacetate formed by transesterification of hydrogenated bisphenol A with 2 moles of t-butylacetoacetate.

1848-10: Type II Michael-Thickening resin formed by reacting 4 moles of DEG with 3 moles of phthalic anhydride, and capping said polymer with 2 moles of acetoacetate derived by ester exchange from ethyl acetoacetate.

1878-12: Propoxylated bisphenol A diacetoacetate 1878-14: Diacetoacetate formed by transesterification of a polyester diol (formed by condensing 4 moles of diethylene glycol and 3 moles of maleic anhydride followed by reaction with cyclopentadiene for conversion of backbone unsaturated esters to nadic functionalities) with 2 moles of ethylacetoacetate.

1878-15: Diacetoacetate formed by transesterification of a polyester diol formed by condensing 4 moles of diethylene glycol and 3 moles of phthalic anhydride with 2 moles of ethylacetoacetate.

7401-172: Free radical polymerization of a 2-ethylhexyl acrylate, 2-acetoacetoxyethyl methacrylate mixture formulated in a 95/5 weight percent ratio containing 20% HDDA.

CIPS Definitions.

Reactive Thickening Agent: A resin component, prepolymer, or combination thereof, which is capable of forming a polymer network within the CIPS prepreg resin component during the paste maturation period to provide enhanced prepreg thickening.

Organic Reactive Thickening Chemistry: Polymer linking reaction chemistry used in a given CIPS paste thickening chemistry, examples of which are:
 a. Michael Thickening: Reactive thickening chemistry based on the Michael addition reaction.
 b. Urethane Thickening: Reactive thickening chemistry based on the isocyanate-alcohol reaction.
 c. Epoxy Thickening: Reactive thickening chemistry based on reaction of an epoxy group with any co-reactive functionality.

Plastically-Deformable Flexible CIPS Prepreg (Cross-Linked): These are CIPS prepreg systems formed from combinations of crystalline chain-extended thickening components in combination with flexible CIPS prepreg chemistries. Prepregs of this type are stiff, but can be bent to small radii without cracking or crazing.

CIPS Resin Prepolymer: A resin having the ability to undergo a combination of independent processes. One being the capability of undergoing maturation to an intermediate (B-stage) form maintained in the prepreg. A second being the capability of curing to a thermoset stage by an appropriate secondary process.

CIPS Paste Maturation: A process whereby a CIPS paste is catalyzed to allow a thickening reaction to take place to an extent sufficient to permit paste casting or extrusion into a uniform thickness sheet prepreg. This prepreg is capable of undergoing further thickening, or cross-linking to allow development of target properties.

CIPS Cast Prepreg Continuous Process: A method whereby a CEPS prepreg paste is matured via a continuous process to a stage at which casting onto a carrier film, or coated belt, will result in a finished sheet product in a commercially feasible time-frame.

CIPS Extruded Prepreg Continuous Process: A method whereby a CIPS prepreg paste is processed in a continuous mixer (such as a Reedco Mixer) under vacuum to provide a low void content thick paste suitable for extrusion to form a sheet product, with said product optionally having the capability of undergoing subsequent further maturation to a finished product.

CIPS Thickening Catalyst or Reactant: A component added to the CIPS prepreg paste which initiates, or promotes the paste thickening process.

CIPS Highly-Reacted Thickening Network: A network formed in the CIPS maturation process created by extensive chain-extension, or other cross-linking process. Such networks require little additional cross-linking to achieve final cure. Systems of this type are characterized by low shrinkage and maintenance of flatness on cure.

COMPARISON EXAMPLE 1

Laboratory Preparation of Prepreg

For laboratory prepreg preparations, the resin and reactive monomer (70/30/7221/TMPTA and TMPTA) are added to a Tripour® beaker and ATH (GE 241) was weighed in on top of the resin. The system is mixed with a spatula and transferred to a clean section of the bench-top. Hand kneading is used to form the resin-filler into a thick paste. Next, an empty beaker is used to weigh 1.5 grams of the silica (Aerosil® 100) thickener/filler. The additives (photoinitiator, peroxide, mercaptan, and amine methacrylate) are weighed into the silica and mixed. The silica-additive mixture is kneaded into the main paste to create a high viscosity slightly sticky paste which had been thoroughly mixed. The paste is then placed between two sheets of film and rolled into a sheet of uniform thickness. The recommended thickness for solid surface cladding is 100-150 mils. One carrier sheet is Mylar® which stays engaged with the prepreg through an installation process, the second sheet is an easily removed film sheet such as Glad Cling Wrap. The formulation components are given in Table I.

TABLE I

| NB 7196 | 196-0<br>PI + Peroxide | | 196-1<br>190-0 + 0.100 g TS +<br>0.350 g DMAEMA | |
|---|---|---|---|---|
| Component | gm. | % | gm. | % |
| TMPTA/7221(30%/70%) | 15.05 | 15.69 | 15.05 | 15.61 |
| TMPTA | 5.07 | 5.28 | 5.07 | 5.26 |
| GE 241 | 73.53 | 76.64 | 73.53 | 76.28 |
| Aerosil ® 100 | 1.51 | 1.57 | 1.51 | 1.57 |
| I-819 | 0.45 | 0.47 | 0.45 | 0.47 |
| PDO | 0.33 | 0.35 | 0.33 | 0.34 |
| TS | 0 | 0 | 0.1 | 0.1 |
| DMAEMA | 0 | 0 | 0.35 | 0.36 |
| Total | 95.94 | 100 | 96.39 | 100 |

EXAMPLE 2

Development of a Void-Free Paste (Free From Organic Thickening Chemistry)

The prepreg composition described in Table II is produced by an associative thickening process which allows the use of low viscosity resin components to prepare completely degassed low void pastes which produced low void prepregs on thickening.

TABLE II

Void-Free CIPS Paste Composition and Preparation Procedure

| NB-7239-052<br>Paste Component | −1<br>gms. | Percent | Procedure for preparation of paste: |
|---|---|---|---|
| Q6585/TMPTA:<br>50/50% | 150 | 48.28 | 1) Charge resin*<br>2) Add filler |
| OE 431 | 150 | 48.28 | 3) Mix in FVZ Speed Mixer |
| L-256 | 1.8 | 0.58 | 4) Degas under vacuum |
| I-819 | 1.4 | 0.45 | 5) Add peroxide and photoinitiator |
| Mod M | 7.5 | 2.41 | 6) Mix in FVZ mixer |
| Total | 310.7 | 100.00 | 7) Add thickening agent (Mod M) |
| Voids after cure | 0 | | 8) Degas under vacuum. |
| Barcol Hardness** | 64 | | 9) Check initial viscosity. |
| Maturation Time | V cps | | 10) Let mature to~30 MM cps |
| Initial | 100M | | |
| 24 hr | 262M | | |
| 96 hr | 2.4 MM | | |
| 120 hr | 9.2 MM | | |
| 5 days | 24 MM | | |
| 7 days | 25 MM | | |
| 14 days | 34 MM | | |

*4-ounce FVZ Speed Mixer plastic cup
**Prepreg cured at 8.5 inches from Halogen Lamp cover glass.

The prepreg in Example 1 is completely plastic with thickening being provided by the filler system. In Example 2, the thickening comes from a combination of filler and associative thickening. In the latter case, the Mod M is a product containing magnesium oxide. This component is able to form complexes with the free carboxyl groups on the chain termini of the Q6585 polyester. With time the paste viscosity grows to convert the prepreg into a tough/pliable consistency. The system described in Example 2 has advantage over Example 1 since lower viscosity pastes may be used. This example merely demonstrates that using a low viscosity pastes can achieve degassing and casting to provide low void levels that would be desirable in a CIPS product.

EXAMPLE 3

Formulation and Procedure for a Castable CIPS Void-Free CIPS Prepreg System

Paste Preparation:

A 40 gram quantity of Q-6585 (65% solids in styrene), 10-grams of styrene and 50 grams OE 431 are mixed in a centrifugal mixer (FVZ speed mixer) for 1.0 min at 2200 rpm. The mixture is degassed for 10 minutes using a vacuum oven at 24.8 inches of vacuum. The paste is checked for bubbles by spreading a 1 mil film of a paste onto a glass plate and viewing under a microscope at 400× magnification. The system shows a high void (bubble) level. Additional paste components are added including 1.87 grams of BMC 806, 0.80 grams of I-819, 0.70 grams of Lupersol® 256 and 2.5 grams of Mod M. The resulting composition is mixed for 1.0 minute at 2200 rpm. The mixture is checked for voids. Very few voids are noted. The mixture is then degassed in a vacuum oven at maximum vacuum for 30 seconds. A further check for voids reveals that the mixture is void free.

The mixture is cast onto a sheet of Mylar® at a prepreg film thickness of 60 mils and allowed to thicken for 48 hours. After thickening, a scrim is placed on the exposed face of the prepreg. A nylon release film is placed on the scrim face and the prepreg is placed between two glass plates and compressed to create two parallel and flat surfaces. At this time the prepreg composite is found to be free of distortion and capable of being handled. At this point the prepreg is suitable for indefinite storage. The scrim used is a vinyl plastisol-coated fiberglass screen that easily separates from the prepreg leaving a uniform waffle pattern.

A 2×2 inch square of a counter material based on decorative laminate coated particle board is coated at 2 mils with a 2-part epoxy adhesive on the decorative laminate face. A 2×2 inch piece of the prepreg is prepared by removing the scrim backing. The back-side face of the prepreg is placed in contact with the adhesive treated substrate and pressure applied to consolidate the adhesive interface. After the epoxy is allowed to set for 5 minutes, the Mylar®-covered face of the prepreg was exposed to a 500 Watt Halogen Lamp at a distance of 8.5 inches from the lamp cover-glass for a period of 10 minutes. After cure, the Mylar® is removed. The cured-in-place prepreg has a high-gloss surface with a Barcol Hardness of greater than 50.

Aged Prepreg Results

A sample of the above prepreg is aged at room temperature for a period of 24 days. During that time, the paste thickened beyond measurement capabilities to >200 MM cps. The paste system is not fully cured and remains flexible enough to bend on a mandrel having a radius of 0.125 inches without cracking. The prepreg can be handled without imprinting under normal handling. A 2×3 inch rectangle of the prepreg is cut and placed onto the surface of a decorative laminate coupon. Acute-angle inspection of the prepreg surface Mylar® film shows no detectable distortion. Reflection of complex images by the film showed good reproducibility without distortion further indicating surface flatness. The supporting screen-scrim is removed from the backside of the prepreg specimen leaving a uniform waffle pattern covering the prepreg back-side. A 1-2 mil coating of a 5-minute cure, 2-part epoxy adhesive is applied to the decorative laminate coupon. The prepreg is placed onto the adhesive and slight pressure is applied to the prepreg surface using a flat-surface platen. The pressure is maintained for 5 minutes. Next, the prepreg is cured for a period of 10 minutes under a 500 Watt halogen lamp at a distance of 8.5 inches from the glass filter covering the lamp. At the end of the cure period, the sample is removed from the lamp and allowed to stand under ambient light for 10 minutes. The Mylar® cover film is removed to reveal a high-gloss finish. An inspection for flatness identical to the initial inspection described above shows retention of flatness. Flatness prior to and after cure is assessed by observing a target reflection consisting of a series of parallel lines. Flatness assessment is based on maintenance of line linearity for reflections across the total sample. Prepreg flatness prior to cure was based on the reflection from the Mylar® carrier sheet, while flatness after cure is assessed by reflection from the cured composite. For the properly formed prepreg (prepreg mature paste sheet top and bottom parallelism) this "flatness" test indicates retention of flatness after composite photo cure.

EXAMPLE 4

Michael Addition Thickened Prepreg

The following, Table III is a typical paste formulation using the Michael-Thickening resins described in the definition of compounds.

TABLE III

Ref. 7277-176-1

| Component | gm. | % | Description |
|---|---|---|---|
| 1848-10 | 2.02 | 13.63 | Michael Donor |
| TMPTA | 4.00 | 26.98 | Michael Acceptor |
| 1878-1 | 0.50 | 3.37 | Michael Donor |
| OE 431 | 8.00 | 53.97 | ATH Filler |
| I 819 | 0.06 | 0.37 | Photoinitiator |
| L-256 | 0.07 | 0.47 | Peroxy Ester |
| aux cat | 0.11 | 0.74 | Michael Catalyst |
| NaOH 50% | 0.07 | 0.47 | Michael Catalyst |
|  | 14.82 | 100.00 |  |

The resulting solution contains a mobile Michael anion catalyst.

The paste formed from the composition described above is made by the following procedure: the prepolymer resin components (1848-10, TMPTA and 1878-1) are weighed into a 50 ml Tripour® beaker and mixed using a vibratory mixer. The filler component is added and mixed with an agitator followed by vibratory mixing. The peroxide and photo-initiator components are added. The auxiliary catalyst component is added followed by mixing. The 50% caustic component is added followed by mixing, and by occasional vibratory mixing. Mixing is continued until the paste thickened. The prepreg casting point is reached when the consistency of the paste underwent transition to a string-forming B-stage viscosity, as determined by drawing of the mixing spatula from the maturing paste. At the observed casting point, the reaction mixture is cast onto a sheet of Mylar®. A second sheet of release film is place onto the cast paste which is then flattened between platens to a desired prepreg thickness.

The release film is removed once the prepreg has attained a viscosity sufficient to allow stripping of the release film. This time depends on the cross-linking rate in the prepreg paste. The resultant prepreg is print-resistant and flexible.

EXAMPLE 5

Flexible Prepreg Prepared Using a Cast-Prepreg Method

EXAMPLE 5A

Preparation of 9000 Gram Scale Flexible Prepreg

Prepreg Preparation Process:

A flexible CIPS prepreg process is developed consisting of two steps. In the first step, a series of Michael Donors and Acceptors are reacted to produce a chain-extended prepolymer composition. In the second step, a trifunctional Michael Acceptor facilitates cross-linking of the chain extended system to give rise to a flexible print-free prepreg. In the procedure, Parts A and B pastes are prepared by weighing the resin components into double thickness one gallon paper buckets and adding the respective filler charges. The thickening catalyst (50% NaOH) is added to Part A (chain extension stage) and the system is allowed to thicken. Subsequently, the Part B (cross-linking component) paste is added in stages to the thickened Part A, with final mixing being conducted in a polypropylene bucket along with additional catalysis immediately before casting. The thickened paste is cast onto a vibrating prepreg casting table and drawn to thickness using a 0.125 inch gap draw-down bar. The paste sheet is vibrated to remove trapped gases. The maturation process is allowed to proceed to the final cross-linked stage, generating a handleable, flexible, prepreg. The compositions of the Part A and B pastes are given in Table IV. The 9000 gram batch produced a 3×5 foot prepreg sheet, which is large enough to clad typical counter top assemblies.

TABLE IV 9000 gram Prepreg Paste Batch Formulation
Example VI Component Description 7405-67

| | Component | gm. | % | Description |
|---|---|---|---|---|
| Part A | | | | |
| 1 | 1878-15 | 138.3 | 1.54 | Michael Donor |
| 2 | 1848-10 | 138.3 | 1.54 | Michael Donor |
| 3 | 1878-4 | 118.78 | 1.32 | Michael Donor |
| 4 | 1878-1 | 118.78 | 1.32 | Michael Donor |
| 5 | SR610 | 445.44 | 4.95 | Acrylic Polyether |
| 6 | HDDA | 148.48 | 1.65 | Acrylic Monomer |
| 7 | BMC806 | 19.04 | 0.21 | Defoam/Wetting |
| 8 | I-819 | 38.09 | 0.42 | Photoinitiator |
| 9 | L-256 | 6.92 | 0.08 | Peroxide |
| 10 | GE241 | 2423.71 | 26.93 | Filler |
| Part B | | 0 | 0 | |
| 11 | TMPTA | 1576.43 | 17.52 | Acrylic Monomer |
| 12 | BMC806 | 19.04 | 0.21 | Defoam/Wetting Agent |
| 13 | GE241 | 3808.68 | 42.32 | Filler |
| Total | | 9000 | 100 | |
| | First 50% NaOH | 4.87 | | |
| | Second 50% NaOH | 3.65 | | |

9000 Gram CIPS Prepreg Paste Batch Procedure:
1. (Part A) Into a 1-gallon double paper bucket, parts A-1 to A-9 are weighed and mixed. A-10 is added, mixed, and the resultant paste degassed under vacuum.
2. (Part B) Into a 1-gallon double paper bucket, parts B-11 and B-12 are weighed and mixed. Next, B-13 is added, mixed and the resultant paste degassed under vacuum.
3. Next, 4.87 g of 50% NaOH is added to Part A and mixed. The mixture is allowed to exotherm and increase in viscosity from 5500 to >11000 cps. After the target temperature and viscosity are reached step 4 is begun.

4. The content of Part B is added to Part A in two stages. In the first stage mixing is continued until the viscosity and temperature prior to addition are attained. At this point the remaining Part B components are added to the Part A/Part B mixture, and mixed until the viscosity and temperature observed prior to mixing are attained.
5. Next, 3.65 g of 50% NaOH is added and mixed for 2 minutes before casting the advanced paste onto a Mylar® film mounted on a prepreg casting table.
6. The sample is then leveled using a draw-down bar, and degassed by vibration.
7. The cast system gels in 6-7 minutes after casting. The resulting prepreg shows a high degree of flexibility and could be repeatedly bent at 180° angles without cracking or crazing.

The finished prepreg is filmed with a nylon cover-sheet for stacking and storage. On use, the cover sheet is removed to expose the prepreg surface for bonding to the substrate. The Mylar® cover sheet can be retained during photo-cure to provide an oxygen barrier. Alternatively, the Mylar® sheet can be removed and replaced with an in-situ cast coating film (based on various brushable, or sprayable polyvinyl acetate solutions) which serves as a conformal oxygen barrier film. Processing of these prepreg veneers has shown that the cast film provides a unique and unexpected advantage to the CIPS process. It appears that the in-situ films impart a planarization to the cured prepreg surface. These planarizing films appear to form a coherent flat surface on the curing composite which is retained after the curing process. After removal, a flat surface is attained on the cured composite which requires minimal sanding to achieve target surface performance. Films of this type mitigate defects such as "orange peel" seen as a result of Z-directional shrinkage under poorly adhered films such as Mylar®.

EXAMPLE 5B

Effect of Paste Composition on Prepreg Processing

The formulations presented in Table V are used to prepare sheet prepregs which are bonded to particle board-decorative laminate substrates using a 2-part epoxy adhesive. The constructions are then cured using a 500 Watt halogen-lamp for 12 minutes at a distance of 8.5 inches from the lamp-face glass shield.

The prepolymer components are weighed into a Tripour® beaker and mixed using a vibratory mixer. The OE 431 is added and mixed. The peroxy-ester and photo-initiator components are added and mixed as above. The reaction mixture is catalyzed using the stated combination of the auxiliary catalyst* and 50% sodium hydroxide.

*Auxiliary catalyst-(Aux Cat) is produced by adding 0.60 grams of diethylmalonate to a 5 dram vile, then adding 0.7 grams of 50% NaOH, finally adding 0.060 grams of water and mixing.

The reaction mixture is subject to continuous mixing during which time thickening was observed. At a point of advancement near to the paste "gel-point" the thickened paste is discharged onto a sheet of Mylar®. A second film (nylon-release-film) is placed on top of the discharged paste and the paste mass is rolled to a desired sheet thickness.

For experimental formulations, the end-point for thickening is determined empirically and varied with the formulation composition and B-staging catalyst system. The paste "mix-time" is dependent on the amount and type of catalyst used and the rate of stirring. The key feature associated with use of the auxiliary catalyst system is the ability of the cast prepreg paste to continue advancement even after being "cast-out" during prepreg sheet formation.

The cast prepreg sheet continues to advance (B-stage) to a point at which the release sheet can be stripped cleanly from the prepreg. This point is known as the release time, which can vary in duration as a function of rate of prepreg advancement after cast-out and its initial proximity to the paste gel-point.

Composite Preparation

A 2×2 inch section of the prepreg 7277-176-4 having a thickness of 110 mils is bonded to a substrate prepared using a 6×6 inch section of standard particle board-decorative laminate composite. To accomplish bonding, the strippable film is removed from a 2×2 inch piece of the prepreg. A sample of 2-part 5-minute set-time epoxy adhesive is pre-mixed and applied to the decorative laminate composite surface at a thickness of approximately 1.0 mil. The exposed face of the prepreg is placed onto the adhesive coating and pressure is applied to achieve intimate contact of the adherents. The composite is allowed to cure for a period of 15 minutes. Next, the sample is irradiated at 8.5 inches from the cover glass of a 500 Watt halogen lamp for a period of 12 minutes. The sample is cooled and aged under normal fluorescent lighting

TABLE V

| Component | 7277-176-1 | | 7277-176-2 | | 7277-176-3 | | 7277-176-4 | |
|---|---|---|---|---|---|---|---|---|
| | gm. | % | gm. | % | gm. | % | gm. | % |
| 1848-10 | 2.02 | 13.63 | 2.11 | 14.15 | 3.93 | 13.30 | 3.93 | 14.27 |
| TMPTA | 4.00 | 26.98 | 4.00 | 26.82 | 8.00 | 27.08 | 7.50 | 27.23 |
| 1878-1 | 0.50 | 3.37 | 0.50 | 3.35 | 1.00 | 3.39 | 0.50 | 1.82 |
| OE 431 | 8.00 | 53.97 | 8.00 | 53.64 | 16.00 | 54.16 | 15.00 | 54.47 |
| I-819 | 0.06 | 0.37 | 0.06 | 0.37 | 0.11 | 0.37 | 0.11 | 0.40 |
| L-256 | 0.07 | 0.47 | 0.07 | 0.46 | 0.14 | 0.47 | 0.14 | 0.51 |
| Aux. Cat. | 0.11 | 0.74 | 0.11 | 0.74 | 0.22 | 0.74 | 0.22 | 0.80 |
| 50% NaOH | 0.07 | 0.47 | 0.07 | 0.47 | 0.14 | 0.47 | 0.14 | 0.51 |
| Total | 14.82 | 100.00 | 14.91 | 100.00 | 29.54 | 100.00 | 27.54 | 100.00 |

The following procedure is used to prepare CIPS prepreg samples using the Table V formulations which are then used to prepare solid-surface veneer clad composites.

for 24 hours. The Barcol Hardness is >50. The sample is tested for adhesion to the substrate and exhibits excellent adhesion.

The effect of paste advancement at time of casting on prepreg flexibility and release time is assessed during prepreg preparation from the Table V formulations. These data are summarized in Table VI.

TABLE VI

Effect of Advancement at Cast-Out on Flexibility and Release Time

| NB 7277- | 176-1 | 176-2 | 176-4 | 176-5 |
|---|---|---|---|---|
| Degree of Advancement at Cast-out* | 1-low | 10-high | 5-Intermediate | 8-high |
| Time to Release (min.) | >90 | <5 | <20 | <5 |
| Flexibility | good | moderate | low | good** |

Degree of advancement at cast-out is an estimation of Michael Addition-induced branching thickening relative to the amount of branching to achieve the gel point.
*1-Low; 10 High
**The amount of cross-linking group (1878-1) drops from 3.4% to 1.8%.

Time to release-time is a measure of the time to achieve the point where prepreg tack is reduced sufficiently to allow release sheet removal.

EXAMPLE 6

Pigmented Prepreg Sample

A typical formula for blue pigmented CIPS paste is presented in Table VII. The non-pigmented control formulation is identical except that it does not contain a pigment.

TABLE VII

| Components | gm. | % | Description |
|---|---|---|---|
| Q6585/TMPTA (50%/50%) | 21.15 | 22.95 | Resin |
| PDO | 0.33 | 0.36 | Peroxy ester |
| TS | 0.60 | 0.65 | Mercaptan |
| I-819 | 0.48 | 0.52 | Photoinitiator |
| Thiourea | 0.07 | 0.08 | Acylthiourea |
| TMPDE | 1.82 | 1.97 | Diallyl Ether |
| Blue Pigment | 0.10 | 0.11 | Pigment |
| OE 431 | 65.00 | 70.52 | Filler |
| Aerosil ® 100 | 2.62 | 2.84 | Thickener |
| Total | 92.17 | 100.00 | |

Figure 4:
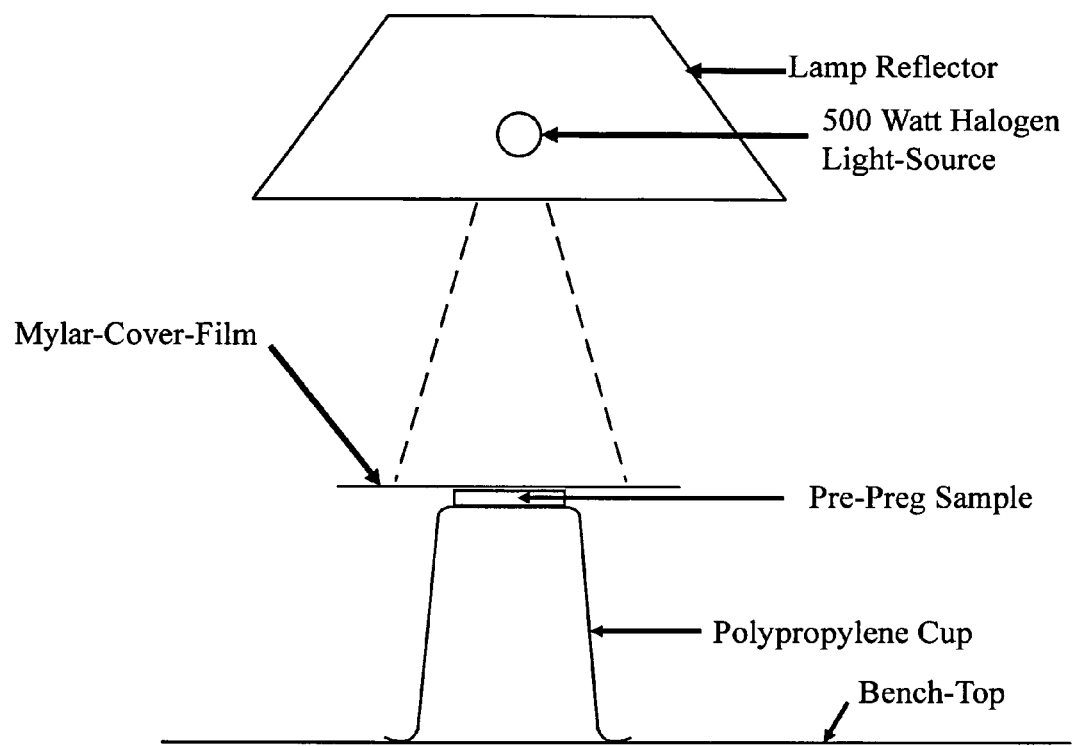
FIG. 4 is a diagram of a prepreg curing station using a halogen light source.
Figure 5:
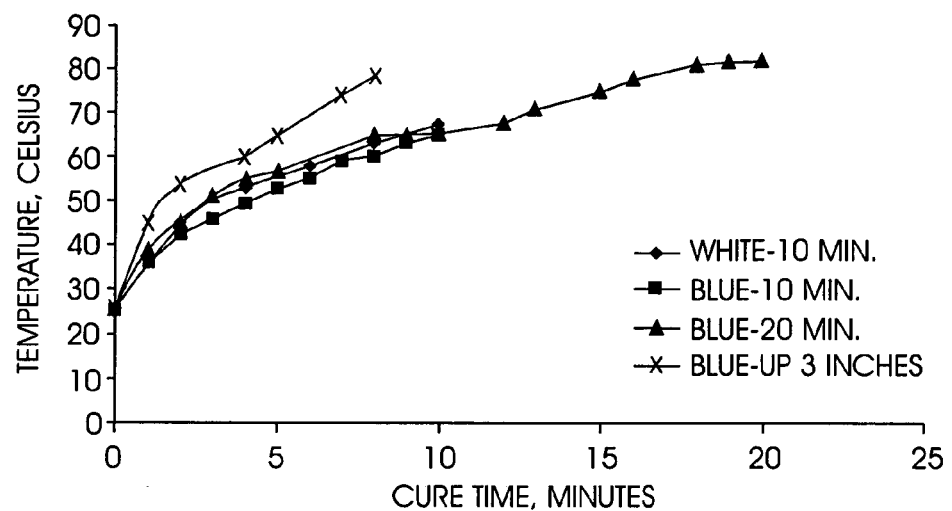
FIG. 5 is a graph showing cure temperature profile data for pigmented and unpigmented prepregs.
Figure 6:
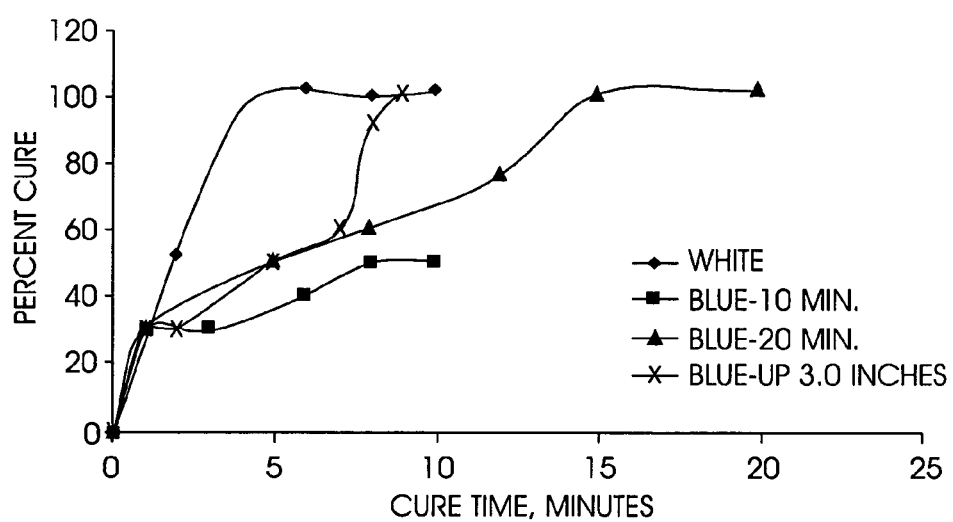
FIG. 6 is a graph showing cure data for pigmented and unpigmented prepregs.

In order to simulate an actual countertop installation, sample sections of a particle board decorative laminate are used as a substrate with a 0.1000 inch layer of the CIPS prepreg bonded to the substrate using 2-part 5-minute epoxy adhesive. Samples of pigmented and non-pigmented paste are prepared using the formula presented in Table VII and the procedure used in Example 1. These are cured using the apparatus presented in FIG. 4. Prepregs having a thickness of 100 mil are prepared using a rolling process. To accomplish this, a 5.0 gram sample of the prepreg paste that is prepared from the Table VII mix is formed into a ball. The ball is placed between two sheets of a strippable nylon film and rolled into a circular prepreg using a rolling pin. The desired thickness is attained by using 2-100 mil spacers. The prepreg so formed is flat, parallel-faced and circular in shape having a diameter of approximately 1.5 inches. A sample block 1.5×1.5 inches is cut from a piece of commercial decorative laminate-faced particle board. The block is used as a substrate to provide a simulation of the actual substrate envisioned for a cure-in-place commercial process. A layer of a pre-mixed 2-part 5-minute epoxy is applied to the decorative laminate surface of the coupon at a thickness of 2-3 mils. One face of the prepreg has the film removed and the prepreg placed onto the previously applied epoxy adhesive, while the remaining face is stripped of its film and covered with a Mylar® film, which is maintained on the surface of the sample during cure. The Mylar® film acts as an oxygen barrier. The adhesive bond of the prototype is allowed to cure for 5 minutes. The sample is then placed at an 8.5 inch distance from the face of a 500 watt halogen lamp and irradiated. In the experiment described in this example, multiple samples are irradiated simultaneously. With this method, samples are removed during the course of the irradiation at prescribed intervals. These samples are cut cross-section and the degree of cure measured directly. In addition, a thermocouple well is formed between the prepreg and substrate surface of one of the sample set allowing placement of a thermocouple to assess the prepreg/substrate interface temperature during the course of the irradiation. Thus, a temperature and cure-depth profile is assessed simultaneously. In an initial experiment a comparison was made between the halogen-light cure of non-pigmented and pigmented cure-in-place samples. FIG. 5 presents the temperature profiles observed for a non-pigmented prepreg cured at a distance of 8.5 inches from the lamp face for duration of 10 minutes. Also shown are two pigmented prepreg samples that are run for durations of 10 and 20 minutes. Finally, a temperature profile curve is prepared for the pigmented sample cured at a distance 5 inches from the face of the lamp. FIG. 6 shows the conversion data for the four samples.

EXAMPLE 7

Flexible-Rigid Prepreg

Methods designed to produce flexible CIPS prepregs generally produce systems which are too flexible. Fabricators want CIPS prepregs which are formable, but which maintain a level of stiffness approaching that of decorative laminate sheet.

The following uses crystalline diacetoacetates to impart unique performance attributes to CIPS prepreg systems. The performance of CIPS Michael Addition-thickening polymer networks can be improved through the use of crystalline chain-extended thickening components. These are monomeric or oligomeric components which can be added to the prepreg paste resin systems to enhance non-bonded inter-chain interactions in their polymerized state. Generally, these materials are derived from elevated melting point crystalline components which can be derivatized to achieve activity and compatibility in the thickening process.

For this example, the chain-extended thickening component is the diacetoacetate of hydrogenated bisphenol A. Similar derivatives from 1,4-cyclohexanediol, 1,4-dimethylolcyclohexane, norbornanediols, and the like can provide similar beneficial effects. By themselves, the crystalline thickening additives produce thickened CIPS prepregs that could stand improvement with respect to rigidity and flexibility. This property can be addressed by adding a reactive flexibilizing component. These are materials which are reactive with the thickening chemistry to form more flexible linkages, allowing the achievement of smaller bend radii without CIPS prepreg failure during installation. For this example the reactive thickening component is SR 610.

CIPS prepregs produced with the above combination of thickening additive components produce systems which are both deformable without breaking, and also have high retained stiffness. In addition, casting of these prepreg pastes onto a flat/smooth surface produce a prepreg capable of maintaining flatness on curing of its CIPS-bonded prepeg veneers.

These prepregs also show the capability of being surface-finished to enhance back-side bond adhesion and final product flatness.

EXAMPLE 7A

Preparation of 3×3 Foot Flexible-rigid Prepreg Sheet

General Prepreg Process:

Parts A and B pastes are prepared by weighing the resin components identified in Table VIII into appropriate containers and adding the respective filler charges. The thickening catalyst (40% NaOH) is added to Part A and the system is advanced to target viscosity and temperature. Subsequently, the Part B paste is added to the advanced Part A paste and the reaction is allowed to proceed to the prescribed casting temperature. The paste is cast onto a vibration table and drawn to thickness using a 0.125 inch gap draw-bar down bar. The paste sheet is vibrated to remove trapped gases. The maturation process proceeds to the final cross-linked stage, which generates a handleable, flexible prepreg. The 5000 gram batch example described later in Table VIII produces a prepreg large enough for cladding a 4-6 square foot counter surface area.

TABLE VIII

Component Description

| | Component | gm. | % | Comment |
|---|---|---|---|---|
| Part A | | | | |
| 1 | 1878-4 | 517.5 | 10.35 | Michael Donor |
| 2 | TMPTA | 1035.3 | 20.71 | Acrylic Monomer |
| 3 | I-819 | 48.4 | 0.98 | Photo-initiator |
| 4 | BMC806 | 21.0 | 0.42 | Defoam/Wetting |
| 5 | GE241 | 3110.7 | 62.21 | Filler |
| 6 | NaOH (40%) | 8.3 | 0.17 | Catalyst |
| Part B | | | | |
| 7 | SR610 | 258.8 | 5.18 | Acrylic Polyether |
| | Total | 5000.0 | 100.0 | |

5000 gm CIPS Prepreg Paste Batch Procedure:
1. Into a 1-gallon double paper bucket (Part A), parts A-1 to A-4 are weighed and mixed. Part A-5 is added, mixed and degassed under vacuum.
2. Into a 400 ml Tripour® beaker (Part B) part B-7 is weighed and degassed under vacuum.
3. Part A-6 is added to Part A with mixing and the paste is allowed to exotherm to 33° C. After the target temperature is reached, proceed to step 4.
4. The contents of Part B are added to the Part A mixture.
5. The combination is mixed to a paste temperature of 42° C., cast onto the draw-down table to a paste thickness of 100 mils, and then vibrated to remove trapped gases from the paste film.

The cast sheet sets to a flexible cross-linked prepreg sheet in 4-6 minutes. The finished prepreg is tack-free and storable without back-side filming. The Mylar® cover sheet can be retained during photo-cure to provide an oxygen barrier. Alternately, the Mylar® sheet can be removed and replaced with an in-situ cast coating film which serves as a conformal oxygen barrier film as described herein above.

Installation: The substrate is a 2×2 foot×0.75 inch particle board panel which has been reinforced on its perimeter with an additional frame of 4.00×0.75 inch particle board stock. The prepreg produced in this example is used to form a solid-surface veneer on the substrate. This is accomplished by first applying a uniform coating of 2-part 5-minute epoxy adhesive to the substrate surface using a serrated trowel. The applied adhesive is allowed to build tack prior to application of the veneer to the substrate. In this example the Mylar® facing is retained on the veneer surface to act as an oxygen barrier during cure. The prepreg is applied by contacting one edge of the prepreg with the substrate and rolling the contacted surface with a 1-inch diameter rolling pin to extend the contact area. This procedure prevents the formation of unbonded regions caused by air-pockets. After the initial bonding stage, the surface is rolled with a 50-pound, 3-inch diameter steel roller to ensure good adhesive contact and penetration. The composite is allowed to stand for 1 hour to achieve adhesive cure. Next, the composite is placed in exterior light. The day is overcast, but a surface cure to a Barcol hardness of 45-50 is achieved in 1 hour. Prior to prepreg installation, the deviation form planarity of the substrate is noted by measuring the out-of-plane deviations at the corners from a planar surface. After cure, only one corner shows a measurable (1 mm) deviation from pre-cure planarity measurements. This result confirms an earlier observation that shrinkage in this rigid-flex prepreg system is minimal.

EXAMPLE 7B

Rigid-Flexible Prepreg Shrinkage-on-cure Assessment

Formulation in Table IX is used to produce a CIPS prepreg system.

TABLE IX

| | Materials | gm. | % | Description |
|---|---|---|---|---|
| Part A | | | | |
| 1 | 1878-4 | 10.71 | 10.42 | Michael Donor |
| 2 | TMPTA | 21.43 | 20.85 | Michael Acceptor |
| 3 | I-819 | 0.55 | 0.54 | Photoinitiator |
| 4 | L-256 | 0.42 | 0.41 | Peroxy Ester |
| 5 | GE 241 | 64.29 | 62.54 | Filler |
| 6 | 50% NaOH | 0.05 | 0.04 | Michael Catalyst |
| Part B | | | | |
| 7 | SR 610 | 5.35 | 5.2 | Acrylic Polyether |
| | Total | 102.8 | 100 | |
| | Barcol | 45 | | |
| | Shrinkage | 0.83 mil/in | | |

100 Gram CIPS Rigid-Flex Prepreg Paste Batch Procedure (Based on 7239-094):
1. Into a 100 ml Tripour® beaker is added components A-1 through A-4 with mixing.
2. A-5 is added with mixing and paste degassed under vacuum.
3. A-6 is added and the paste mixed. Temperature and time measurements are started.
4. At 33° C., B-7 is added with continued mixing.
5. At 42° C. the paste is discharged.

The above paste is cast into a 6×6 inch inside dimension aluminum frame 100 mils thick taped over a sheet of Mylar® sheet mounted with tape on a glass plate. The paste is leveled using vibration to produce a sheet prepreg of uniform thickness which assumes the inside dimensions of the aluminum frame after paste B-stage completion. Next, the exposed surface of the prepreg is covered with an additional Mylar® sheet and a second plate of glass. The prepreg sheet so formed matures to a pliable prepreg taking the shape of the frame. The sample is cured by placing the assembly in direct sunlight for a period of 15 minutes for each side of the prepreg. After curing the assembly is cooled and the prepreg is marked with reference points on the frame before being removed from the frame. The frame and corresponding points on the cured prepreg are measured using a digital caliper instrument. The dimensions from the frame and the prepreg are compared to determine in-plane shrinkage of the prepreg during the curing process. The shrinkage is 0.83 mils/in. The Barcol hardness of the cured prepreg is determined to be 45.

EXAMPLE 8

Near Print-Free CIPS Prepregs

EXAMPLE 8A

This approach to producing a near-print-free CIPS prepreg uses the Michael Reaction developed for the CIPS-cast prepreg method. In an initial verification experiment, a normal "cast" method prepreg paste formulation is modified by raising its filler loading from 50% to 70%. At the 50% filler loading, thickening ensues with the addition of 0.10 gm of 50% sodium hydroxide per 100 gm. of the prepreg paste followed by mixing. The 50% filler paste composition thickened to a print-free composition. In the modification used in this example, the Michael resin, a polyacrylate monomer, and filler are combined to make a paste which is further modified by photo-initiator additive addition. Advancement of the system is achieved by incremental caustic addition followed by kneading of the paste to promote the thickening reaction. The paste formulation used is provided in Table X.

TABLE X 7355-59

| Component | gm. | % | Description |
|---|---|---|---|
| 1848-10 | 8.00 | 7.34 | Michael Donor |
| 1878-1 | 1.00 | 0.92 | Michael Donor |
| TMPTA | 15.00 | 13.76 | Michael Acceptor |
| OE 431 | 85.00 | 77.98 | Filler |
| Total | 109.00 | 100.00 | |

Prior to addition of the caustic, 0.220 gm. of I-819 and 0.280 gm. of L-256 are added to the paste with kneading. A total of 0.10 gm. of 50% NaOH is added dropwise. The paste is kneaded for a period of 15 minutes during which time the system transformed into a thickened, plastic paste. The paste is then formed into a ball and compressed to a thickness of 100 mils between two nylon film sheets using flat platens and stops. On standing overnight, the formed prepreg sheet increases in print resistance, but maintained the ability to be plastically deformed. The advanced prepreg thickening rate plateaus at the end of 3 days thus providing a plastic CIPS prepreg having the desired handling capability. The prepreg can be bonded to a substrate and cured by irradiation to a solid surface veneer.

EXAMPLE 8B

Method for Producing Low-shrink Near-print-free Prepreg

TABLE XI 7428-71-1

| No. | Component | gm. | % | Description |
|---|---|---|---|---|
| 1 | 1878-4 | 2.00 | 4.47 | Michael Donor |
| 2 | TMPTA | 6.00 | 13.40 | Michael Acceptor |
| 3 | 40% NaOH | 0.05 | 0.11 | Michael Catalyst |
| 4 | GE 241 | 15.00 | 33.50 | Filler |
| 5 | SR610 | 2.00 | 4.47 | Acrylic Polyether |
| 6 | GE 241 | 16.00 | 35.74 | Filler |
| 7 | I-819 | 0.37 | 0.83 | Photoinitiator |
| 8 | L-256 | 0.30 | 0.67 | Peroxy Ester |
| 9 | 40% NaOH | 0.05 | 0.11 | Michael Catalyst |
| 10 | 914 VE | 3.00 | 6.70 | Vinyl Ester |
| 11 | Total | 44.77 | 100.00 | |

Procedure:

1. To a Tripour® beaker are added components 1 and 2 with mixing.
2. Component 3 is added and mixed for 1-2 minutes to initiate the exotherm.
3. Component 4 is added and mixing continued until the reaction mixture reaches 28° C. At that point, component 5 is added with mixing until the 28° C. reaction temperature is reestablished.
4. Components 6, 7, and 8 are added consecutively with mixing.
5. The paste is mixed by kneading due to its high viscosity. Component 10 was slowly added and kneaded until the paste thickened to a dough-like consistency. (Note: at this point, the paste exhibits an exothermic reaction, raising the temperature of the paste to >30° C.)
6. The thickened paste is rolled into a ball and flattened to a uniform 100 mil thickness between two plastic films. The prepreg continues to thicken to a nearly print-free consistency, attaining a ball penetrometer reading of >90 in 3-5 days.

The above prepreg cures easily to a Barcol hardness of >50 in 10-15 minutes under a 500 watt halogen halogen light source when coated with an appropriate oxygen barrier film.

This example describes CIPS prepreg pastes which are thickened to CIPS thermoplastic prepregs that are nearly print-free using Michael Addition and other thickening chemistries. In this example, Michael Donor systems are added to pastes prepared from reactive resins and filler. These can be prepared by degassing low viscosity mixtures to yield low void pastes. They may then be formed into flexible sheet plastic prepregs, which are latently thickened to provide nearly print-free systems.

EXAMPLE 8C

This example demonstrates a method for producing Michael CIPS pastes which can be further reactively thickened to produce a CIPS plastic prepreg systems. This example involves preparation of reactive CIPS prepreg paste components that can also be used to thicken conventional CIPS prepreg pastes.

EXAMPLE PASTE 8C1

A Typical Michael Thickening Paste

TABLE XII 7355-41

| No. | Component | gm. | % | Description |
|---|---|---|---|---|
| 1 | 1848-10 | 8.00 | 7.53 | Michael Donor |
| 2 | 1878-1 | 1.00 | 0.94 | Michael Donor |
| 3 | TMPTA | 15.00 | 14.11 | Michael Acceptor |
| 4 | OE 431 | 30.00 | 28.23 | Filler |
| 5 | I-819 | 0.22 | 0.21 | Photoinitiator |
| 6 | L-256 | 0.28 | 0.26 | Peroxy Ester |
| 7 | Aux. Cat. | 0.44 | 0.41 | Michael Catalyst |
| 8 | 50% NaOH | 0.28 | 0.26 | Michael Catalyst |
| 9 | OE 431 | 51.06 | 48.04 | Filler |
|  | Total | 106.28 | 100.00 |  |
|  | Filler | 81.06 | 76.27 |  |

Procedure for Paste 8C-1 Preparation:
1. Components 1-6 are mixed.
2. Component 9 is added to complete initial thickening.
3. Mixing of the paste is continued until a thick putty consistency is attained. At this point, all thickening is a result of filler addition; reactive thickening only ensues upon addition of catalyst to the paste system.
4. Catalyst components 7 and 8 are added with mixing immediately before mixing the combination paste described in the following procedure for making the near print-free CIPS prepreg.

The Michael thickening paste 8C-1 is mixed with quantities of the traditional CIPS plastic paste putty described in 8C-2.

EXAMPLE PASTE 8C-2

Traditional CIPS Plastic Paste

A typical formulation of the traditional plastic paste putty is presented in Table XIII.

TABLE XIII 7239-033

| No. | Component | gm. | % | Description |
|---|---|---|---|---|
| 1 | TMPTA/7221 (50%/50%) | 1125.00 | 25.09 | Base Resin |
| 2 | PDO | 4.80 | 0.11 | Peroxy Ester |
| 3 | I-819 | 7.70 | 0.17 | Photoinitiator |
| 4 | Thiourea | 0.69 | 0.02 | Acylthiourea |
| 5 | GE 241 | 3285.00 | 73.27 | Filler |
| 6 | Aerosil ® 100 | 60.00 | 1.34 | Thickener |
|  | Total | 4483.19 | 100.00 |  |

Procedure for 8C-2:
1. Components 1-4 are charged into a ribbon blender and mixed.
2. Component 5 is added slowly with mixing.
3. Component 6 is added with mixing to complete the plastic paste after mixing until homogeneous.
4. The paste is discharged and flattened into sheets, stored under refrigeration (0° C.).

EXAMPLE 8C-3

Reactive Paste Additive

To a Tripour® beaker is added 20 grams of TMPTA and 10 grams of EAA. The reaction is initiated through the addition of 1 drop of 20 % NaOH. The reaction has a long induction period, but became very exothermic. The temperature is held below 60° C. by ice bath cooling (with periodic sample removal to sustain the exotherm). The resulting product is a highly viscous liquid with no gel component. Optionally, the resin mixture can be extended with OE 431 filler (30-50 wt. %) for ease of handling.

Procedure for making near-print-free reactively-thickened CIPS thermoplastic prepreg:

This process is accomplished by reactive blending of the 8C-1, 8C-2, and 8C-3 components using the following procedure:
1. 60 grams of 7239-033 (paste 8C-2) is modified by adding 4 grams of 1848-10 and 10 grams of OE 431 to the paste. This is achieved by hand kneading the paste. Designated Paste A.
2. Designated catalyzed 7355-41(paste 8C-1) as Paste B.
3. 1 drop of 50% NaOH is added to 30 grams of Paste A and kneaded for 5 minutes (system exothermed).
4. 1 drop of 50% NaOH is added to 30 grams of Paste B with kneading (system exothermed)
5. Half of Paste A (modified in Step 3) is added to 30 grams of Paste B and 1 drop of 50% NaOH, and then mixed.
6. The remainder of Paste A is added to the mix with an additional drop of 50% NaOH with continued mixing.
7. 10 grams of the TMPTA/EAA reactive mixture (paste 8C-3) is added to the paste combination described in step 6, and two more drops of 50% NaOH are added with mixing until the paste is warm to the touch.
8. The paste is separated into 5 balls of equal size, and placed onto a nylon film mounted on a platen in an array equivalent to the 5-spot on a die. A second film is placed on top of the array and paste is compressed between two platens. The paste is compressed to a thickness of 0.125 inches using bar-stops. At this point the release film can be stripped and replaced to create a smooth top and bottom face of the prepreg. The prepreg thickened on standing to provide a rigid print-resistant prepreg which is plastically deformable and able to achieve small radius curvatures. A ball penetrometer (sold under the name NO. 473 Green Hardness Tester (B) Scale by Dietert Foundry Testing Equipment Inc.) shows the print resistance of the prepreg rising from a reading of 40 to >98 on the penetrometer dial scale after standing at room temperature for 3 days. The matured prepreg is capable of being bonded using a thermosetting adhesive to rigid substrates prior to cure, and could be thermally or photolytically cured. The thermoplastic prepreg so described is capable of being fused by application of pressure in the uncured state prior to cure to achieve a seamless solid surface juncture in the cured state.

Plastic nearly print-free CIPS prepregs have the following key advantages:
1. Being plastic, said prepregs can be fused at installation to give seamless junctures for installations.
2. Very high filler levels are possible, lowering the cost of the prepreg.

3. High viscosity prepregs of this type, with low resin volumes, have low shrinkage potential
4. Adding a portion of the filler to the resin produces a fluid paste that can be degassed. Thickening of the paste can provide sufficient paste viscosity to resist additional air pickup. The remainder of the filler can be added to the paste followed by degassing under shear and vacuum to produce a low void paste.
5. Mixing systems such as the Reedco Mixer, which are capable of generating high paste-air interfacial areas during the paste mixing cycle, can provide low void-content pastes suitable for making CIPS solid surface prepregs.

EXAMPLE 9

CIPS Prepregs Produced Using Urethane Reactive Thickening

EXAMPLE 9A

This example demonstrates a method for producing a CIPS paste using polyurethane-generation thickening process which produces a reactively thickened CIPS plastic or thermoset prepreg. A paste formulation which uses urethane thickening to provide a level of thickening needed for prepreg handling is presented in Table XIV.

TABLE XIV 7428-47

| No. | Component | gm. | % | Description |
|---|---|---|---|---|
| 1 | TMPTA | 6.00 | 23.20 | Reactive Monomer |
| 2 | D N330A | 2.00 | 7.73 | Polyisocyanate |
| 3 | Vorinol 800 | 1.00 | 3.87 | Activated Polyol |
| 4 | Zolidine MS | 0.50 | 1.93 | Water Scavenger |
| 5 | I-819 | 0.18 | 0.70 | Photoinitiator |
| 6 | T-12 | 0.18 | 0.70 | Urethane Catalyst |
| 7 | GE 241 | 16.00 | 61.87 | Filler |
| | Total | 25.86 | 100.00 | |

EXAMPLE 9A

Procedure

1. Components 1, 3, 4 and 5 are charged to a Tripour® beaker and mixed.
2. Component 7 added with mixing.
3. Components 2 and 6 are then added with mixing. Measurement of the reaction time and temperature are begun at this point.
4. After approximately 17 minutes at a paste temperature of 36-38° C. The paste is cast onto a Mylar® film, and compressed to a target thickness (100 mils) using a second film, bar-stops, and a flat platen.
5. The prepreg formed gels within 10 minutes, after which time the films can be stripped to reveal a flexible low-tack prepreg suitable for use as a solid surface veneer.

In order to produce a cured composite, the example is maintained between the Mylar® sheets and cured in sunlight for 1 hour. A CIPS solid surface panel so produced has a Barcol hardness averaging 35.

EXAMPLE 10

CIPS Prepregs Produced Using Epoxy Reactive Thickening

EXAMPLE 10A

This example provides a method for producing a CIPS prepreg using epoxy-reactive thickening. In this method a diepoxy monomer (EPON™ 828) is prereacted with an amine having both primary and secondary amine functionality (DETA). The resultant chain extended product has secondary amine functionality from the secondary amine groups in the polyamine and those formed by reaction of the contained primary amine groups with the epoxide groups of the epoxy monomer. In a subsequent step in the paste maturation process, a photoreactive polyacrylate monomer is added to the reaction mixture. The acrylic functionalities reacted with any remaining primary amine groups through Michael Addition to provide additional thickening of the paste. A latent addition of the epoxy monomer produces final cross-link network formation through the reaction of secondary amine groups with the diepoxy epoxide groups. The aforementioned reaction sequence provides the formation of a cross-linked polymer network providing a flexible CIPS prepreg.

A paste formulation which utilizes epoxy reactive thickening is presented in Table XV

TABLE XV 7428-66

| No. | Component | gm. | % | Description |
|---|---|---|---|---|
| 1 | E828 | 5.00 | 9.21 | Epoxy Monomer |
| 2 | SR610 | 2.00 | 3.68 | Polyetheracrylate |
| 3 | GE 241 | 14.00 | 25.78 | Filler |
| 4 | DETA | 0.50 | 0.92 | Polyamine |
| 5 | TMPTA | 5.00 | 9.21 | Polyacrylic Monomer |
| 6 | DETA | 0.50 | 0.92 | Polyamine |
| 7 | GE 241 | 10.00 | 18.42 | Filler |
| 8 | TMPTA | 5.00 | 9.21 | Polyacrylic Monomer |
| 9 | GE 241 | 10.00 | 18.42 | Filler |
| 10 | E828 | 2.00 | 3.68 | Epoxy Monomer |
| 11 | I-819 | 0.30 | 0.55 | Photoinitiator |
| | Total | 54.30 | 100.00 | |
| | Filler | 34.00 | 62.62 | |

EXAMPLE 10A

Procedure

1. Components 1, 2, and 3 are charged into a Tripour® beaker and mixed.
2. Component 4 is added with mixing allowing the system to advance through amine and acrylate incorporation into the prepolymer. The chain-extension reaction is indicated by viscosity build and stringing.
3. Components 5 and 6 are added, allowing acrylate and amine incorporation into the prepolymer using the end-point defined in Step 2.
4. Components 7, 8, and 9 are added consecutively to advance and thicken the paste.
5. Component 10 is added to provide paste advancement to the prepreg casting stage.

6. Component 11 is added during the advancement period described in Step 4.
7. The paste (when high viscosity and stringing is attained) is cast onto a uniform sheet formed between two Mylar® sheets using spacers. The casting is allowed to remain undisturbed until a gelled network is formed.
8. The prepreg gelled 60 minutes after casting, at which time the films can be stripped to reveal a flexible low-tack prepreg suitable for curing to a solid surface veneer using visible radiation.
9. In this example, the prepreg formed in Step 8 is removed from the carrier film, coated on both sides with an oxygen-barrier cast film and cured under a 500 watt halogen lamp for 30 minutes to provide a flat (indicative of low shrinkage) cured solid surface composite exhibiting a Barcol hardness of >35.

This is an example of a CIPS prepreg formed using epoxy thickening chemistry. It demonstrates that flexible print-free prepregs can be produced capable of being radiatively cured to serviceable solid surface prepregs. The specific intermediate prepolymer resin produced in this example consists of an epoxy-amine reacted with polyacrylic monomers through amine Michael addition.

EXAMPLE 11

CIPS Prepregs Produced Incorporating Poly(meth)acrylate Toughening

EXAMPLE 11A

This example demonstrates a method for producing a CIPS paste incorporating high molecular weight toughening polymers which are capable of maturation to thermoplastic or cross-linked/flexible CIPS prepregs exhibiting improved toughness in their cured state. A paste formulation which incorporates PMMA as a toughening agent is presented in Table XVI

TABLE XVI 7428-72

| No. | Component | gm. | % | Description |
|---|---|---|---|---|
| 1 | PMMA | 4.70 | 4.77 | Polymethylmethacrylate |
| 2 | 1878-4 | 9.50 | 9.63 | Michael Donor |
| 3 | TMPTA-1 | 14.00 | 14.20 | Michael Acceptor |
| 4 | OE 431-1 | 28.00 | 28.40 | Filler |
| 5 | 20% NaOH | 0.25 | 0.25 | Michael Catalyst |
| 6 | TMPTA-2 | 14.00 | 14.20 | Michael Acceptor |
| 7 | OE 431-2 | 28.00 | 28.40 | Filler |
| 8 | I-819 | 0.15 | 0.15 | Photoinitiator |
| | Total | 98.60 | 100.00 | |
| | Filler | 56.00 | 56.80 | |

EXAMPLE 6A

Procedure

1. Component 1 is weighed into a 50 ml glass beaker and heated to melt.
2. Component 2 is added with heat and mixing to achieve a homogeneous melt.
3. Component 3 is added with mixing and then component 4 is added to achieve a CIPS prepreg paste.
4. Component 5 is added and mixed until thickened to a high viscosity paste.
5. Components 6, 7, and 8 are added consecutively and mixed until casting viscosity is attained.
6. The paste is cast between two sheets of Mylar® and allowed to mature to a handleable prepreg.

EXAMPLE 12

Effect of CIPS Prepreg Composition and Additives on In-Plane Shrinkage During Cure

EXAMPLE 12A

Low shrinkage system achieved by additive and oligomer addition.

Table XVII shows two low shrink formulations containing E828, and differing in the type of oligomer additive used:

TABLE XVII 7239-090

| | | #1 | | #2 | | |
|---|---|---|---|---|---|---|
| No. | Component | gm. | % | gm. | % | Description |
| | Part A | | | | | |
| 1 | 1848-10 | 1.80 | 1.92 | 1.80 | 1.91 | Michael Donor |
| 2 | 1878-1 | 1.50 | 1.60 | 1.50 | 1.59 | Michael Donor |
| 3 | 1878-4 | 1.50 | 1.60 | 1.50 | 1.59 | Michael Donor |
| 4 | E828 | 2.00 | 2.13 | 2.00 | 2.12 | Epoxy Monomer |
| 5 | SR415 | 1.00 | 1.07 | 1.00 | 1.06 | Acrylic Monomer |
| 6 | HDDA | 1.50 | 1.60 | 1.50 | 1.59 | Acrylic Monomer |
| 7 | BMC 806 | 0.23 | 0.24 | 0.23 | 0.24 | Defoam/Wetting Agent |
| 8 | I-819 | 0.37 | 0.39 | 0.37 | 0.39 | Photoinitiator |
| 9 | L-256 | 0.30 | 0.32 | 0.30 | 0.32 | Peroxy Ester |
| 10 | GE 241 | 28.00 | 29.82 | 28.00 | 29.73 | Filler |
| 11 | 50% NaOH | 0.08 | 0.09 | 0.08 | 0.08 | Michael Catalyst |
| | Part B | | | | | |
| 12 | TMPTA | 4.63 | 4.93 | 0.00 | 0.00 | Michael Acceptor |
| 13 | CN968 | 8.75 | 9.32 | 0.00 | 0.00 | Urethane Acrylic |
| 14 | SR9035 | 0.00 | 0.00 | 13.68 | 14.52 | Acrylic Monomer |
| 15 | BMC 806 | 0.23 | 0.24 | 0.23 | 0.24 | Defoam/Wetting Agent |
| 16 | GE 241 | 42.00 | 44.73 | 42.00 | 44.59 | |
| | Total | 93.89 | 100.00 | 94.19 | 100.00 | |

The following procedure is used to prepare the above prepregs:

1. All components in Part A, except component 11, are mixed in a Tripour® beaker.
2. All components in Part B are mixed in a second beaker.
3. Both Parts A and B are degassed under vacuum.
4. One drop (80 mg) of 50% NaOH(component 11) is added to Part A and with mixing.
5. Part A is mixed until a temperature of 29° C. is attained.
6. One-half of the mixture of Part B is added to the beaker containing A and mixed until a temperature of 31.0-31.5° C. is attained.
7. The remainder of Part B is added to the A-B mixture.
8. The temperature of the mixture is allowed to rise to 31.5-31.9° C., and cast.

Shrinkage and Barcol data for 7239-090-1 and -2 are presented in Table XVIII.

TABLE XVIII

Shrinkage/Barcol Data

| | 7239-090 | |
|---|---|---|
| | −1 | −2 |
| Shrinkage | 0.42 mil/inch | 0.58 mil/inch |
| Barcol | 40 | 0 |

The E828 and CN968 appear to be the key factors in achieving low shrinkage. The urethane allows the system to achieve good Barcol development along with low shrinkage.

EXAMPLE 12B

Low Shrinkage System Achieved by E828 Addition

Table XIX shows two CIPS prepreg formulations, one of which contains E828 and the other without the E828.

TABLE XIX 7239-092

| | | #1 | | #2 | | |
|---|---|---|---|---|---|---|
| No. | Component | gm. | % | gm. | % | Description |
| | Part A | | | | | |
| 1 | 1878-12 | 1.35 | 3.07 | 1.35 | 3.00 | Michael Donor |
| 2 | 1878-1 | 0.05 | 1.14 | 0.50 | 1.11 | Michael Donor |
| 3 | E828 | 0.00 | 0.00 | 1.00 | 2.22 | Epoxy Monomer |
| 4 | SR610 | 3.50 | 7.96 | 3.50 | 7.78 | Acrylic Polyether |
| 5 | I-819 | 0.16 | 0.36 | 0.16 | 0.36 | Photoinitiator |
| 6 | L-256 | 0.18 | 0.41 | 0.18 | 0.40 | Peroxy Ester |
| 7 | GE 241 | 8.00 | 18.19 | 8.00 | 17.79 | Filler |
| 8 | BMC 806 | 0.12 | 0.27 | 0.12 | 0.27 | Defoam/Wetting Agent |
| 9 | 30% NaOH | 0.04 | 0.09 | 0.04 | 0.09 | Michael Catalyst |
| | Part B | | | | | |
| 10 | TMPTA | 8.00 | 18.19 | 8.00 | 17.79 | Michael Acceptor |
| 11 | BMC 806 | 0.12 | 0.27 | 0.12 | 0.27 | Defoam/Wetting Agent |
| 12 | GE 241 | 22.00 | 50.03 | 22.00 | 48.92 | Filler |
| | Total | 43.97 | 100.00 | 44.97 | 100.00 | |

Shrinkage and Barcol hardness development are presented in Table XX.

Procedure for preparing prepregs 7239-092-1 and -2:
1. All components in Part A, except component 9, are added to a Tripour® beaker with mixing.
2. All components in Part B are added to a second beaker with mixing.
3. Both Parts A and B are degassed under vacuum.
4. One drop (60 mg) of 30% NaOH is added to Part A with mixing.
5. Part A is mixed until a temperature of 28.0 to 28.5° C. is attained.
6. One-half of Part B is added to part A with mixing until a temperature of 29.0-29.2° C. is attained.
7. The remainder of Part B is added and mixed until a temperature of 31.5-31.9° C. is attained and then cast for the duration of maturation.

TABLE XX

Shrinkage/Barcol Data

| | 7239-090 | |
|---|---|---|
| | −1 | −2 |
| Shrinkage | 4.25 mil/inch | 1.67 mil/inch |
| Barcol | 48 | 30 |

Conclusion:
E828 addition decreases X-Y shrinkage in during photo-cure in the above CIPS prepreg systems.

EXAMPLE 12C

High Degree of CIPS Prepreg Prereaction

These prepreg systems are formed with a high level cross-linking in the prepreg B-stage step such that the high-shrinkage radical-addition stage contribution is minimized.

The formulation in Table XXI is used to produce a CIPS prepreg system.

TABLE XXI 7239-094

| No. | Component | gm. | % | Description |
|---|---|---|---|---|
| | Part A | | | |
| 1 | 1878-4 | 10.71 | 10.42 | Michael Donor |
| 2 | TMPTA | 21.43 | 20.85 | Michael Acceptor |
| 3 | I-819 | 0.55 | 0.54 | Photoinitiator |
| 4 | L-256 | 0.42 | 0.41 | Peroxy Ester |
| 5 | GE 241 | 64.29 | 62.54 | Filler |
| 6 | 40% NaOH | 0.05 | 0.04 | Michael Catalyst |
| | Part B | | | |
| 7 | SR610 | 5.35 | 5.20 | Acrylic Polyether |
| | Total | 102.80 | 100.00 | |
| | Barcol | 45 | | |
| | Shrinkage | 0.83 mil/inch | | |

Procedure for Preparing Prepregs 7239-094:
1. All components in Part A, except component 6, are added to a Tripour® beaker with mixing.
2. All components in Part B are added to a second beaker with mixing.
3. Both Parts A and B are degassed under vacuum.
4. One drop (50 mg) of 40% NaOH is added to Part A.
5. Part A is mixed until a temperature of 32.5-33.5° C. is attained.
6. All of Part B is added to Part A and mixed until a temperature of 40-42° C. is attained.
7. The product is then cast.

The paste is cast into an aluminum frame to provide a sample for shrinkage measurement. The prepreg is cured using the prescribed shrinkage determination method. The cured prepreg gives shrinkage of 0.83 mils/inch, and a Barcol hardness of the 45.

EXAMPLE 12D

High Degree of CIPS Prepreg Pre-reaction-Second Example

A second sample having a high level cross-linking in the prepreg B-stage step is prepared and tested for shrinkage performance.

The formulation in Table XXII is used to produce a CIPS prepreg system.

TABLE XXII 7239-093

| No. | Component | gm. | % | Description |
|---|---|---|---|---|
| 1 | TMPTA | 12.00 | 35.88 | Michael Acceptor |
| 2 | OE 431 | 17.00 | 50.83 | Filler |
| 3 | I-819 | 0.40 | 1.20 | Photoinitiator |
| 4 | BMC 806 | 0.10 | 0.30 | Defoam/Wetting Agent |
| 5 | AATMP | 1.20 | 3.59 | Michael Donor |
| 6 | EAA | 2.70 | 8.07 | Michael Donor |
| 7 | 40% NaOH | 0.05 | 0.13 | Michael Catalyst |
| | Total | 33.45 | 100.00 | |
| | Barcol | 40 | | |
| | Shrinkage | 0.96 mil/inch | | |

Procedure for Preparing Prepregs 7239-094:
1. Components 1-4 are added to a Tripour® beaker and degassed under vacuum.
2. Components 5 and 6 are added to the beaker and mixed.
3. One drop (50 mg) of 40% NaOH is added to the mix.
4. The paste is mixed until a temperature of 32.5-33.5° C. is attained and stringing of the paste is observed indicating high chain-extension.

The paste is cast into a 6×6 inch aluminum frame to provide a sample for shrinkage measurement. The prepreg is cured using the prescribed shrinkage determination method. The cured prepreg gives shrinkage of 0.96 mils/inch, and a Barcol hardness of 40.

EXAMPLE 13

Flexible CIPS Prepreg Formed Using Staged Process and Monomeric Michael Donor Linking Agents

EXAMPLE 13A

This example used a variation of the CIPS Staged Prepreg Process. In this example a chain-extended Michael Addition polymer is prepared in an A-Stage paste reaction between a diacrylate monomer and a monomeric Michael Donor capable of linking two acrylic groups. In a second step, a B-Stage paste containing a polyacrylate functional monomer is added to the reactive A-paste with mixing. The resultant paste is allowed to mature to its cast-out viscosity, at which point the prepreg paste is cast into a sheet which advances further to a print-free state, providing a CIPS prepreg suitable for handling.
Table XXIII describes the formulation composition for this Example.

TABLE XXIII 7355-121

| No. | Component | gm. | % | Description |
|---|---|---|---|---|
| | Part A | | | |
| 1 | HDDA | 3.00 | 7.09 | Michael Acceptor |
| 2 | EAA | 3.00 | 7.09 | Michael Donor |
| 3 | GE 241 | 15.00 | 35.43 | Filler |
| 4 | I-819 | 0.12 | 0.28 | Photoinitiator |
| 5 | L-256 | 0.12 | 0.28 | Peroxy Ester |
| 6 | BMC 806 | 0.50 | 1.18 | Defoam/Wetting Agent |
| 7 | 50% NaOH | 0.10 | 0.24 | Michael Catalyst |

TABLE XXIII-continued 7355-121

| No. | Component | gm. | % | Description |
|---|---|---|---|---|
| | Part B | | | |
| 8 | TMPTA | 5.00 | 11.81 | Michael Acceptor |
| 9 | BMC 806 | 0.50 | 1.18 | Defoam/Wetting Agent |
| 10 | GE 241 | 15.00 | 35.43 | Filler |
| | Total | 42.34 | 100.00 | |

Procedure:
1. The first six components of Part A are charged to a Tripour® beaker with mixing.
2. All components of Part B were charge to a second beaker.
3. The contents of each beaker are mixed and degassed under vacuum.
4. The seventh component of Part A is added to the beaker A.
5. Part A is mixed until a temperature of 35° C. is attained. The reaction of EAA and HDDA generates a high level of chain-extension.
6. One-half of the contents of beaker B are added to beaker A and mixed until a temperature of 35° C. is attained.
7. The contents of beaker A are added to the remaining contents of beaker B and mixed until the system attains the desired cast-out viscosity, as indicated by stringing of the paste.
8. The contents are then cast into an aluminum frame, and vibrated to remove voids.

The system gels after standing overnight to form a flexible prepreg. The prepreg could be bent around a 1-inch mandrel and held in that configuration overnight without cracking or crazing. In a control experiment, the above procedure was conducted with all components being added to a single beaker followed by mixing. After caustic addition, the contents are advanced to casting viscosity and cast into an aluminum frame. In the control experiment, the prepreg flexibility to composite failure is very low, as indicated by immediate breakage of the composite upon bending around the 1-inch mandrel. This experiment indicates that the 2-stage process yields a much tougher prepreg as a result of the initial Step A chain extension reaction.

EXAMPLE 13B

In this variation of Example 13A, a portion of the EAA is replaced with a Michael Donor polyester polymer based on diethylmalonate and diol ethers (1878-1). The revised formulation is shown in Table XXIV.

TABLE XXIV 7355-122

| | Component | gm. | % | Description |
|---|---|---|---|---|
| Part A | | | | |
| 1 | HDDA | 3.00 | 6.88 | Acrylic Monomer |
| 2 | EAA | 2.75 | 6.31 | EthylAcetoacetate |
| 3 | 1878-1 | 0.50 | 1.15 | Michael Donor |
| 4 | GE 241 | 15.00 | 34.41 | Filler |
| 5 | I-819 | 0.12 | 0.28 | PI |
| 6 | L-256 | 0.12 | 0.28 | Peroxide |
| 7 | BMC 806 | 1.00 | 2.29 | Defoam/Wetting |
| 8 | 50% NaOH | 0.10 | 0.23 | Michael Catalyst |

TABLE XXIV-continued 7355-122

| | Component | gm. | % | Description |
|---|---|---|---|---|
| Part B | | | | |
| 9 | TMPTA | 5.00 | 11.47 | Acrylic Monomer |
| 10 | BMC 806 | 1.00 | 2.29 | Defoam/Wetting |
| 11 | GE 241 | 15.00 | 34.41 | Filler |
| | Total | 43.59 | 100.00 | |

The example 13A procedure is used on the example 13B composition with the 1878-1 being added to the A-stage of the process. The system gels in less than 30 minutes after cast-out. The prepreg has flexibility equivalent to the prepreg in example 13A.

Summary of Results:
1. Flexible prepregs can be produced at high levels (70% solids) of granular fillers using monomeric Michael Donors and polyfunctional acrylates.
2. The resulting prepregs contain highly advanced oligomers with pendant acrylic functionality. Systems of this type require only slight additional polymerization to achieve target hardness, and are thus low shrinkage systems.

EXAMPLE 14

Continuously Cast CIPS Prepreg Process Verification; A-B Paste Processing Window To verify this capability, a 9000 gram paste batch is prepared as described for the A-B Paste in Example 5. In the paste preparation all of the B-Paste is added to the A-Paste at the end of the A-Paste cycle. The sample is well mixed and 100-200 gm. samples are taken from the resultant paste at 4-5 minute intervals. The viscosities of the paste samples are measured, and caustic added to provide the paste advancement needed to formed a gelled prepreg. The catalyzed paste samples are then cast into a 6x6 inch frame, vibrated for void removal, and cured. A total of 14 samples are taken over a period of 90 minutes. The initial 2-3 paste samples cure to poor quality prepregs. This result indicates that the A- and B-paste components desirably co-react for some minimal time period before the second caustic addition in order to produce good quality prepregs. All other samples cure to form good quality prepregs showing desired flexibility and photo-cure performance. The more advanced samples are mixed for a short time prior to cast-out. The use of less caustic in the second caustic addition results in a lengthened processing window for these more advanced samples. Cooling the A-B-paste mixture also lengthens the processing window after second caustic addition.

Conclusion: There is a broad time period window during which the A-B-Paste can be processed (using secondary caustic addition) to a flexible prepreg suitable for solid surface veneer preparation. It can be catalyzed to target cure rates needed for a continuous CIPS castable prepreg process.

Field Trial to Verify Continuously Cast CIPS Prepreg Process:

The continuously cast flexible CIPS prepreg processing concept is further tested on a pilot continuous processing line under a tolling agreement. In this trial, a continuous process is used to make a flexible 0.125 inch thick prepreg. The 9000 gm. batch formulation described in the earlier Example 5 is used to prepare a paste suitable for casting onto a stainless steel belt designed for continuous casting of polymer sheets.

Procedure for Paste Preparation:
1. Part A and Part B are mixed separately.
2. Both Part A and B are degassed under vacuum for 10 min.
3. The first NaOH addition is made to Part A with mixing. The temperature and viscosity of Part A are monitored. When a viscosity change of 4000 to 6000 cps is attained, Part B is added to the Part A in two stages.
4. The mix time, temperature, and viscosity are monitored.
5. Temperature and viscosity end-point target values for the B-component addition stage are determined empirically from previous batch results. Normally, the reaction between Parts A and B takes 10 to 15 minutes.
6. A second quantity of NaOH was added to the mixture. The combination is thoroughly mixed over a 2 to 3 minute period before casting the mature paste.
7. The paste is cast on a continuous moving stainless steel belt.

Procedure for Prepreg Casting:
1. A film-forming liquid solution of polyvinyl acetate is applied on the belt by brushing, spraying, or dipping to create a release/cover film on the belt to receive the cast prepreg.
2. The liquid film is dried using the hot water-, oil-, or a hot air-heated steel belt.
3. When the cast release film coating reached the paste casting location of the continuous casting apparatus the film is completely dry so that the paste could be cast on it. Note: in an alternative mode, a preformed polymer film can be laid directly onto the belt.
4. The paste is cast on the polymer film (either liquid-formed film or rolled film). The paste gels at a certain distance from the casting location.
5. A top release film is applied to sandwich the prepreg.
6. At the end of belt, the prepreg is rolled.

EXAMPLE 14

Additional Versions of Michael Addition-Based CIPS Prepreg Systems

EXAMPLE 14A

Effect of Monomeric Acrylates on Barcol Development Rate

Polyfunctional acrylates can be cross-linked using polyfunctional acetoacetates. The addition of monofunctional acrylates to pastes containing these materials can increase the rate of Barcol Hardness development. Data in Table XXV illustrate this point.

TABLE XXV

| | 7418-54-1 | | 6803-184A | | 7418-54-3 | | 6803-184C | |
|---|---|---|---|---|---|---|---|---|
| Component | gm. | % | gm. | % | gm. | % | gm. | % |
| TMPTA | 8.50 | 23.58 | 8.50 | 69.16 | 8.50 | 18.94 | 8.50 | 55.59 |
| SR506 | 2.00 | 5.55 | 2.00 | 16.27 | 5.00 | 11.14 | 5.00 | 32.70 |
| DBU | 0.00 | 0.00 | 0.09 | 0.73 | 0.00 | 0.00 | 0.09 | 0.59 |
| I-819 | 0.20 | 0.55 | 0.00 | 0.00 | 0.20 | 0.45 | 0.00 | 0.00 |

TABLE XXV-continued

|  | 7418-54-1 | | 6803-184A | | 7418-54-3 | | 6803-184C | |
| Component | gm. | % | gm. | % | gm. | % | gm. | % |
| --- | --- | --- | --- | --- | --- | --- | --- | --- |
| PI-2 | 0.00 | 0.00 | 0.20 | 1.63 | 0.00 | 0.00 | 0.20 | 1.31 |
| AATMP | 1.50 | 4.16 | 1.50 | 12.21 | 1.50 | 3.34 | 1.50 | 9.81 |
| GE 241 | 23.68 | 65.70 | 0.00 | 0.00 | 29.51 | 65.77 | 0.00 | 0.00 |
| 50% NaOH | 0.16 | 0.44 | 0.00 | 0.00 | 0.16 | 0.36 | 0.00 | 0.00 |
| Total | 36.04 | 100.00 | 12.29 | 100.00 | 44.87 | 100.00 | 15.29 | 100.00 |
| Barcol | 15-25 | | | | 35-45 | | | |
| Prepreg | Flexible | | | | Flexible | | | |

Comments: the resin components are added to a Tripour beaker and mixed thoroughly. Next, filler is added with additional mixing. The catalyst is then added with mixing and temperature monitoring. The paste thickened and is cast onto a piece of Mylar at a point short of gelling. The paste is then sandwiched between the carrier sheet and a second Mylar sheet and allowed to complete the thickening reaction.

EXAMPLE 14B

Effect of Flexible Diacrylate Monomer on Prepreg Cure Rate and Flexibility

SR-368 is a crystalline polyacrylate monomer effective in producing high print-resistant CIPS prepregs. Addition of a flexible diacrylate (tris (2-hydroxy ethyl)isocyanurate triacrylate) increases the flexibility of the resultant prepreg, and the rate of Barcol Hardness development on photo-cure. Data presented in Table XXVI illustrate this point.

tional mixing. The catalyst is added with mixing with temperature monitoring. The paste thickens and is cast onto a piece of Mylar® at a point short of gelation. The paste is sandwiched between the carrier sheet and a second Mylar® sheet and allowed to complete the thickening reaction.

EXAMPLE 14C

Effect of Rigid Diacrylates on CIPS Prepreg Hardness Development Upon Cure

It has been shown that AATMP readily thickens TMPTA pastes under caustic catalysis. Example 14A shows that monofunctional acrylate addition readily facilitates the rate of Barcol hardness development on cure for this system. In contrast, addition of rigid diacrylates appeared to greatly

TABLE XXVI

|  | 7418-60-1 | | 6803-189A | | 7418-60-2 | | 6803-189B | | 7418-60-3 | | 6903-189-0 | |
| Component | gm. | % | gm. | % | gm. | % | gm. | % | gm. | % | gm. | % |
| --- | --- | --- | --- | --- | --- | --- | --- | --- | --- | --- | --- | --- |
| SR-368 | 8.00 | 22.26 | 40.00 | 63.80 | 6.00 | 16.96 | 30.00 | 47.85 | 9.20 | 25.51 | 30.00 | 47.85 |
| SR-247 | 2.00 | 5.56 | 10.00 | 15.95 | 4.00 | 11.13 | 20.00 | 31.90 | 0.00 | 0.00 | 20.00 | 31.90 |
| DBU | 0.00 | 0.00 | 0.30 | 0.48 | 0.00 | 0.00 | 0.30 | 0.48 | 0.00 | 0.00 | 0.30 | 0.48 |
| PI-1 | 0.48 | 1.34 | 0.00 | 0.00 | 0.48 | 1.34 | 0.00 | 0.00 | 0.60 | 1.66 | 0.00 | 0.00 |
| PI-2 | 0.00 | 0.00 | 2.40 | 3.83 | 0.00 | 0.00 | 2.40 | 3.83 | 0.00 | 0.00 | 2.40 | 3.83 |
| AATMP | 2.00 | 5.56 | 10.00 | 15.95 | 2.00 | 5.56 | 10.00 | 15.95 | 2.80 | 7.76 | 10.00 | 15.95 |
| GE 241 | 23.30 | 64.83 | 0.00 | 0.00 | 23.30 | 64.83 | 0.00 | 0.00 | 23.30 | 64.61 | 0.00 | 0.00 |
| 50% NaOH | 0.16 | 0.45 | 0.00 | 0.00 | 0.16 | 0.45 | 0.00 | 0.00 | 0.16 | 0.44 | 0.00 | 0.00 |
| Total | 35.94 | 100.00 | 62.70 | 100.00 | 35.94 | 100.00 | 62.70 | 100.00 | 36.06 | 100.00 | 62.70 | 100.00 |
| Barcol | 40 | | | | 35 | | | | 40 | | | |
| Prepreg | Flexible | | | | Flexible | | | | Stiff | | | |

Comments: The resin components are added to a Tripour® beaker and mixed thoroughly. Next, filler is added with additional mixing.

inhibit the development of hardness on cure of the prepreg. Data presented in Table XXVII illustrate this point.

TABLE XXVII

|  | 7418-191A | | 6803-191AA | | | 7418-191B | | 6803-191B | |
| Component | gm. | % | gm. | % | Component | gm. | % | gm. | % |
| --- | --- | --- | --- | --- | --- | --- | --- | --- | --- |
| TMPTA | 4.80 | 11.46 | 24.00 | 32.81 | TMPTA | 6.00 | 14.29 | 30.00 | 41.01 |
| SR349 | 7.20 | 17.19 | 36.00 | 49.21 | CN120 | 6.00 | 14.29 | 30.00 | 41.01 |
| DBU | 0.00 | 0.00 | 0.35 | 0.48 | DBU | 0.00 | 0.00 | 0.35 | 0.48 |
| I-819 | 0.56 | 1.34 | 0.00 | 0.00 | I-819 | 0.56 | 1.33 | 0.00 | 0.00 |
| PI-2 | 0.00 | 0.00 | 2.80 | 3.83 | PI-2 | 0.00 | 0.00 | 2.80 | 3.83 |
| AATMP | 2.00 | 4.77 | 10.00 | 13.67 | AATMP | 2.00 | 4.76 | 10.00 | 13.67 |
| GE 241 | 27.18 | 64.88 | 0.00 | 0.00 | GE 241 | 27.18 | 64.73 | 0.00 | 0.00 |
| 50% NaOH | 0.15 | 0.36 | 0.00 | 0.00 | 50% NaOH | 0.25 | 0.60 | 0.00 | 0.00 |
| Total | 41.89 | 100.00 | 73.15 | 100.00 | Total | 41.99 | 100.00 | 73.15 | 100.00 |

TABLE XXVII-continued

| | 7418-191A | | 6803-191AA | | | 7418-191B | | 6803-191B | |
|---|---|---|---|---|---|---|---|---|---|
| Component | gm. | % | gm. | % | Component | gm. | % | gm. | % |
| Barcol | 0 | | | | | | | 0 | |
| Prepreg | Flexible | | | | | | | Flexible | |

Comments: The resin components are added to a Tripour® beaker and mixed thoroughly. Next, filler is added with additional mixing. The catalyst is added with mixing with temperature monitoring. The paste thickens and is cast onto a piece of Mylar® at a point short of gelation. The paste is sandwiched between the carrier sheet and a second Mylar® sheet and allowed to complete the thickening reaction.

EXAMPLE 15

CIPS prepreg for solid surface veneer installation typically have a thickness of at least about 0.125 in. It is desirable that such prepregs be able to form curvatures of 1.0 in diameter through a bend of 180°. Also typically it is desired that they exhibit stiffness for ease of handling and installation.

Prepreg curvature forming capability is assessed by bending and clamping 3.0 in. by 0.5 in. prepreg samples 180° around 1.0 in. and 1.5 in. diameter mandrels with determination of time to sample failure by craze cracking-based cleavage.

Prepreg stiffness is assessed by a sag test in which a 1.0 in.×5.0 in.×0.125 in. prepreg sample is secured at one end in a horizontal position by a clamp. The degree of sample sag from horizontal is measured by a 4.0 inch protractor having its base in a horizontal position and origin at the sample point of attachment clamp, thus the sample sag from horizontal can be measured in degrees on the protractor. The degree measurement from planarity is defined as the prepreg sag angle. For ease of prepreg processing, sag angles of less than 20° are desirable.

The flexible-rigid prepreg formulation presented in Example 7B is used to prepare sufficient paste to form a 3.5 in.×7.0 in.×0.125 in prepreg sample. The sample is allowed to age for 3 days at which time samples are cut to perform the sag and curvature capability tests described above. The sag test gives a deviation of <10° for the prepreg and a time to failure of less than 1 minute on the 1.0 in. mandrel curvature test.

The following example provides a method for modifying the Example 7B procedure to achieve a CIPS prepreg system having the above desired levels of stiffness, while sufficient flexibility to meet prepreg curvature installation targets.

In the following example the formulation used in Example 7B is modified as follows. An experimental resin 7401-172 replaces a portion of the polyether diacrylate flexibilizing agent, SR610. The replacement resin is a polyacrylate containing pendant acetoacetate side groups. The crystalline diacetoacetate (1878-4), SR610, and 7401-172 are prereacted under sodium hydroxide catalysis to create a chain-extended prepolymer component which is further advanced in a second stage through reaction with TMPTA. The resultant prepreg exhibits a good degree of stiffness in the sag test (<20°), but is distorted with minimal force to the desired level of curvature. The prepregs prepared in the following example are tested in the curvature forming capability test. The 180° bend test on a 1.0 in. diameter mandrel gives a >2 hr. time to failure.

The experimental resin, 7401-172, used in Formulation 7428-138 below, is formed by free radical polymerization of a 2-ethylhexyl acrylate, 2-acetoacetoxyethyl methacrylate mixture formulated in a 95/5 weight percent ratio followed by dilution to a concentration of 80 weight percent with hexanediol diacrylate after removal of the free radical initiator.

TABLE XXVIII

| | | 7428-138 | | |
|---|---|---|---|---|
| No. | Component | gm. | % | Description |
| | Part A | | | |
| 1 | 1878-4 | 13.54 | 12.31 | Michael Donor |
| 2 | 7401-172 | 1.64 | 1.49 | Michael Acceptor |
| 3 | SR610 | 1.64 | 1.49 | Acrylic Polyether |
| 4 | GE 241 | 15.00 | 13.64 | Filler |
| 5 | BMC 806 | 0.15 | 0.14 | Defoam/Wetting Agent |
| 6 | 40% NaOH | 0.05 | 0.05 | Michael Catalyst |
| | Part B | | | |
| 7 | TMPTA | 23.37 | 21.25 | Michael Acceptor |
| 8 | GE 241 | 53.80 | 48.92 | Filler |
| 9 | I-819 | 0.39 | 0.35 | Photoinitiator |
| 10 | L-256 | 0.20 | 0.18 | Peroxy Ester |
| 11 | BMC 806 | 0.15 | 0.14 | Defoam/Wetting Agent |
| 12 | 40% NaOH | 0.05 | 0.05 | Michael Catalyst |
| | Total | 109.98 | 100.00 | |

Procedure for Preparing Prepreg 7428-138-3:
8. Components 1-5 in Part A are added to a Tripour® beaker with mixing.
9. Components 7-11 in Part B are added to a second beaker with mixing.
10. Both Parts A and B are degassed under vacuum.
11. Component 6 is added to Part A and the system advanced to a temperature of 35° to 36° C.
12. Next, the contents of the second beaker are added to the advanced A-paste along with component 12.
13. The resultant paste is allowed to advance to a temperature of 40° to 41° C.
14. On attainment of the casting temperature, the paste is cast into a rectangular 7.0×3.5 in frame having a thickness of 0.125 in.

The paste is allowed to mature for 16 hr. before initial evaluations. Ability of CIPS prepreg to form small radii curvatures without craze-cracking failure for periods long enough to allow prepreg bonding.

EXAMPLE 16

CIPS prepreg for solid surface veneer installation need to have a thickness in the range of 0.125 in. Such prepregs must also be able to form curvatures of 1.0 in diameter through a bend of 180°. They must also exhibit stiffness for ease of handling and installation.

Prepreg curvature forming capability is assessed by bending and clamping 3.0 in. by 0.5 in. prepreg samples 180° around 1.0 in. and 1.5 in. diameter mandrels with determination of time to sample failure by craze cracking-based cleavage.

Prepreg stiffness is assessed by a sag test in which a 1.0 in.×5.0 in.×0.125 in. prepreg sample is secured at one end in a horizontal position by a clamp. The degree of sample sag from horizontal is measured by a 4.0 inch radius protractor having its base in a horizontal position and origin at the sample point of attachment clamp. Thus, the sample sag from horizontal can be measured in degrees on the protractor. The degree measurement from planarity is defined as the prepreg sag angle. For ease of prepreg processing, sag angles of less than 20° are desirable.

The flexible-rigid prepreg formulation presented in Example 7B is used to prepare sufficient paste to form a 3.5 in.×7.0 in.×0.125 in prepreg sample. The sample is allowed to age for 3 days at which time samples are cut to perform the sag and curvature capability tests described above. The sag test gives a deviation of <10° for the prepreg and a time to failure of less than 1 minute on the 1.0 in. mandrel curvature test.

The following example (7466-33) provides a method for modifying the Example 7B procedure to achieve a CIPS prepreg system having desired levels of stiffness, while sufficient flexibility to meet prepreg curvature installation targets.

In the following example the formulation used in Example 7B is modified as follows. A portion of the TMPTA is replaced with a crystalline triazinetriacrylate, SR 368, and the flexibilizing agent SR 610 is eliminated. The crystalline diacetoacetate, 1878-4, SR 368, and a portion of the TMPTA are weighed into a Tripour® beaker (Beaker A) and heated to 46° C. At this point, the filler component is added. The Beaker A sample viscosity is low enough at this point to allow vacuum degassing. Into a second beaker (Beaker B) are added, the additives, remaining TMPTA, and filler. After mixing, beaker systems are degassed under vacuum. After degassing the temperature of the Beaker A contents is 44° C. Next: the Michael Addition catalyst, sodium hydroxide at 50 percent, was added to Beaker A and the paste is matured for a period of 8 minutes at 45 C. Next, the contents of Beaker B are added to beaker A (temperature of mix is 39.5° C.) and the system is matured with mixing with mixing to a temperature of 41 C. At this point the paste is cast into a rectangular mold.7.0×3.5 inches× 0.125 inches thick and vibrated to remove gas bubbles to create a low void level prepreg. The sample is allowed to mature for 16 hours at which time the resultant prepreg exhibits excellent stiffness in the (sag test <5°), but is distorted with minimal force to the desired level of curvature. The 180° bend test on a 1.0 in. diameter mandrel gives a >24 hr. time to failure. The sample is cured in 10 minutes under a halogen lamp to a Barcol of >50. The sample cures without distortion from planarity indicating low shrinkage.

TABLE XXIX 7466-33

| No. | Component | gm. | % | Description |
|---|---|---|---|---|
| | Part A | | | |
| 1 | 1878-4 | 18.00 | 17.75 | Michael Donor |
| 2 | SR368 | 11.00 | 10.85 | Michael Acceptor |
| 3 | TMPTA | 5.50 | 5.43 | Acrylic Polyether |
| 4 | GE 241 | 34.00 | 33.54 | Filler |

TABLE XXIX-continued 7466-33

| No. | Component | gm. | % | Description |
|---|---|---|---|---|
| 5 | BMC 806 | 0.20 | 0.20 | Defoam/Wetting Agent |
| 6 | 40% NaOH | 0.18 | 0.18 | Michael Catalyst |
| | Part B | | | |
| 7 | TMPTA | 5.50 | 5.43 | Michael Acceptor |
| 8 | GE 241 | 26.10 | 25.74 | Filler |
| 9 | I-819 | 0.70 | 0.69 | Photoinitiator |
| 10 | BMC 806 | 0.20 | 0.20 | Defoam/Wetting Agent |
| | Total | 101.38 | 100.00 | |

Procedure for Preparing Prepreg 7428-138-3:
15. Components 1-4 in Part A are added to a Tripour® Beaker A with mixing.
16. Components 7-10 in Part B are added to a second Beaker B with mixing.
17. Beaker A is heated in a 60° C. oven to a contents temperature of 46° C.
18. Component 5 is added to Beaker A and the temperature dropped to 44.0° C. The viscosity is low enough to allow sample degassing
19. Both Parts A and B are degassed under vacuum.
20. Component 6 is added to Part A and the system advanced to a temperature of 45° C. over a period of 7.5 min.
21. Next, the contents of the Beaker B are added to the advanced Beaker A paste. On addition, the combined sample mixture temperature is reduced to 39.5° C.
22. The resultant paste is allowed to advance with mixing to a temperature of 41° C. over a period of an additional 3.0 minutes.
23. At this point, the paste is cast into a rectangular 7.0 x 3.5 in frame having a thickness of 0.125 in. and vibrated to remove gas bubbles.
24. The paste is allowed to mature for 16 hr. before initial evaluations.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

The foregoing description illustrates and describes the present disclosure. Additionally, the disclosure shows and describes only the preferred embodiments of the disclosure, but, as mentioned above, it is to be understood that it is capable of changes or modifications within the scope of the concept as expressed herein, commensurate with the above teachings and/or skill or knowledge of the relevant art. The described hereinabove are further intended to explain best modes known of practicing the invention and to enable others skilled in the art to utilize the disclosure in such, or other embodiments and with the various modifications required by the particular applications or uses disclosed herein. Accordingly, the description is not intended to limit the invention to the form disclosed herein. Also it is intended that the appended claims be construed to include alternative embodiments.

All publications, patents and patent applications cited in this specification are herein incorporated by reference, and for any and all purposes, as if each individual publication, patent or patent application were specifically and individually indicates to be incorporated by reference. In this case of inconsistencies, the present disclosure will prevail.

What is claimed is:

1. A prepreg comprising the reaction product of a curable composition which comprises: a) polymerizable component that comprises i) a reactive material which reactive material is selected from the group consisting of acrylate monomers, acrylate oligomers, acrylate polymers and combinations thereof, ii) a Michael Addition reactive thickening agent having a β-dicarbonyl reactive methylene Michael Donor, and iii) an activated olefin-functional Michael Acceptor; b) an additive component that comprises a catalyst for the Michael Addition reactive thickening agent and a photoinitiator or peroxide or both; and c) a filler wherein the prepreg comprises a gel having a thermosettable resin that is crosslinked with a crosslink density which imparts recoverable elasticity to the prepreg and wherein the prepreg is a castable paste and the polymerizable component comprises about 3 to about 20 weight percent of the thermosettable resin or a prepolymer and the reactive material in amounts of about 5 to about 30 weight percent and the Michael Addition reactive thickening agent comprises the β-dicarbonyl reactive methylene Michael Donor in amounts of about 3 to about 25 weight percent and the activated olefin-functional Michael Acceptor in amounts of about 4 to about 25 weight percent.

2. The prepreg of claim 1 wherein the amount of the polymerizable component is about 15 to about 55 weight percent; the amount of the filler component is about 45 to about 85 weight percent, and the amount of the additive component is about 0.2 to 3 weight percent.

3. The prepreg of claim 1 wherein the amount of the polymerizable component is about 25 to about 45 weight percent; the amount of the filler component is about 50 to about 75 weight percent, and the amount of the additive component is about 0.3 to 2 weight percent.

4. The prepreg of claim 1 which further comprises an unreactive thermoplastic resin.

5. The prepreg of claim 1 wherein the additive component comprises a member selected from the group consisting of a photoinitiator in amounts of about 0.001 to about 0.2 weight percent; a peroxide in amounts of about 0.05 to about 1 weight percent; and mixtures thereof in amounts of about 0.06 to about 1.2 weight percent.

6. The prepreg of claim 1 which comprises the Michael Addition reactive thickening agent catalyst in amounts of about 0.025 to about 0.25 weight percent.

7. The prepreg of claim 1 further comprising an air-release agent component in amounts of about 0.5 to about 1.5 weight percent.

8. The prepreg of claim 1 which further comprises a stabilizer component.

9. The prepreg of claim 1 which further comprises a flexibilizing component and in amounts of about 2 to about 25 weight percent.

10. The prepreg of claim 1 which has a shelf life in an uncured state of greater than 100 hours at 60° C. or greater than 30 days at room temperature.

11. The prepreg according to claim 1 comprising a Michael addition product.

12. The prepreg according claim 11 wherein the Michael product comprises at least one member selected from the group consisting of polyester diols or polyols which are capped with acetoacetate functionalities; polyesters containing mid-chain β-dicarbonyl-functional esters and hydrogenated bisphenol A diacetoacetate.

13. The prepreg according to claim 1 which comprises a photoinitiator.

14. The prepreg according to claim 13 wherein the photoinitiator comprises a visible light activated photoinitiator.

15. The prepreg according to claim 13 wherein the photoinitiator comprises at least one member selected from the group consisting of an acylphosphine oxide and a cyanine borate.

16. The prepreg according to claim 15 wherein the acylphosphine oxide is bis (2,4,6-trimethylbenzoyl)phenylphosphine oxide.

17. The prepreg according to claim 15 wherein the cyanine borate is an organic-soluble salt of a cationic cyanine dye and tetraalkyl, and/or aryl functional borate anion.

18. The prepreg according to claim 1 which comprises a peroxide.

19. The prepreg according to claim 1 wherein said filler is at least one member selected from the group consisting of alumina, alumina monohydrate, aluminum trihydrate, aluminum hydroxide, aluminum oxide, aluminum sulfate, aluminum phosphate, aluminum silicate, borosilicate, calcium sulfate, calcium phosphate, calcium carbonate, calcium hydroxide, magnesium sulfate, magnesium phosphate, magnesium carbonate, magnesium hydroxide, and silica.

20. The prepreg according to claim 19 wherein said filler comprises aluminum trihydrate.

21. The prepreg according to claim 1 wherein said filler comprises a Group II metal in combination with an oxide of aluminum and/or silica.

22. The prepreg according to claim 1 which further comprises a cure rate-enhancer.

23. The prepreg according to claim 22 wherein said cure rate-enhancer is at least one member selected from the group consisting of mercaptan,disulfide, polysulfide, phosphine, phosphine oxide, vinyl triazine, branched alkyl aryl amine, sulfinamine, sulfonamide, alkyl thiourea, and aryl thiourea.

24. The prepreg according to claim 11 wherein the Michael Addition product comprises poly(meth)acrylates having side-chain acetoacetate groups.

25. The prepreg according to claim 11 wherein the Michael Addition product comprises a reaction product of a crystalline diacetoacetate and a crystalline poly acrylate.

26. The prepreg according to claim 11 wherein the Michael Addition product comprises chain extended products formed by a prereaction between a crystalline diacetoacetate and a crystalline poly acrylate later reacted into a cross linked Michael Addition polymer network.

27. A method of making the prepreg according to claim 1 which comprises obtaining the polymerizable component a) and then adding and mixing with the polymerizable component a), a reactive thickening agent, photoinitiator or peroxide or both and a filler and removing entrained air bubbles.

28. The method according to claim 27 wherein release of entrained air is facilitated by using a vacuum and/or vibration.

29. The method of making the prepreg according to claim 27 which further comprises partially curing to thereby obtain the prepreg.

30. The method according to claim 27 wherein the partially cured prepreg test sample has a degree of sag from horizontal of less than 20 degrees.

31. The method according to claim 27 wherein the partially cured prepreg test sample has a degree of sag from horizontal of less than 5 degrees.

32. The method according to claim 27 wherein said prepreg is formed between two film layers.

33. A method of preparing a solid surface article which comprises curing the prepreg of claim 1.

34. The method according claim 33 wherein said curing comprises radiation.

35. The method according claim 34 wherein said radiation comprises ambient light.

36. The method according claim 33 wherein the curing comprises heating.

37. The method according claim 33 wherein the curing comprises a combination of radiation and heat.

38. The method according to claim 32 wherein the cured prepreg has a linear shrinkage on cure of less than 1 mil/in.

39. A solid surface article comprising the cured prepreg of claim 1 bonded onto a supporting substrate.

* * * * *